United States Patent
Zoppitelli et al.

(10) Patent No.: US 6,325,327 B1
(45) Date of Patent: Dec. 4, 2001

(54) ANTI-VIBRATION SUSPENSION DEVICE WITH TORSION SPRINGS BETWEEN VIBRATORS AND STRUCTURE, FOR A HELICOPTER

(75) Inventors: Elio Zoppitelli, Velaux; Edwin Ortega, Marseilles, both of (FR)

(73) Assignee: Eurocopter (FR)

(*) Notice: Subject to any disclaimer, the term of this patent is extended or adjusted under 35 U.S.C. 154(b) by 0 days.

(21) Appl. No.: 09/589,707

(22) Filed: Jun. 8, 2000

(30) Foreign Application Priority Data

Jun. 22, 1999 (FR) .................................................. 99 07924

(51) Int. Cl.$^7$ .................................................. B64C 27/00
(52) U.S. Cl. .......................................... 244/17.27; 244/54
(58) Field of Search .............................. 244/17.27, 17.11, 244/54; 188/379, 380; 248/559, 636, 638; 416/500

(56) References Cited

U.S. PATENT DOCUMENTS

| 4,088,042 | 5/1978 | Desjardins . |
|---|---|---|
| 4,431,148 | 2/1984 | Mouille . |
| 4,458,862 | 7/1984 | Mouille . |
| 4,720,060 | 1/1988 | Yana . |
| 5,190,244 | 3/1993 | Yana . |
| 5,782,430 | 7/1998 | Mouille . |
| 5,788,182 | 8/1998 | Guimbal . |
| 6,283,408 | * 9/2001 | Ferullo et al. .................... 244/17.27 |

* cited by examiner

*Primary Examiner*—Galen Barefoot
(74) *Attorney, Agent, or Firm*—Piper Marbury Rudnick & Wolfe

(57) ABSTRACT

The anti-vibration suspension device comprises at least three oblique bars pivotably mounted each on the gearbox and on the structure, by means of a rigid lever supporting a vibrating weight and in turn pivotably mounted on this structure, and each lever is also linked to the structure by at least one torsion spring biased about a torsion axis substantially perpendicular to the radial plane defined by the axes of the rotor and the corresponding oblique bar.

27 Claims, 15 Drawing Sheets

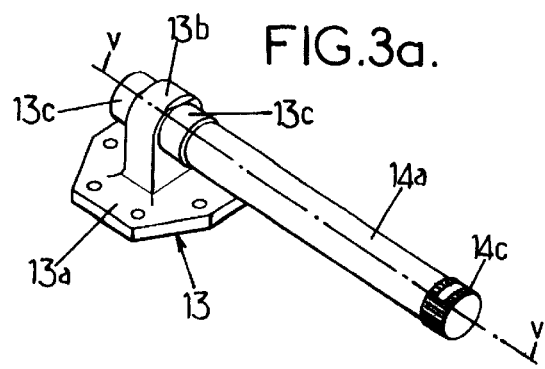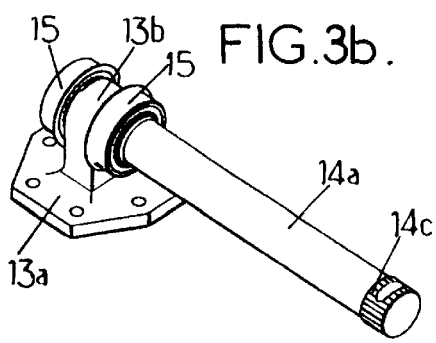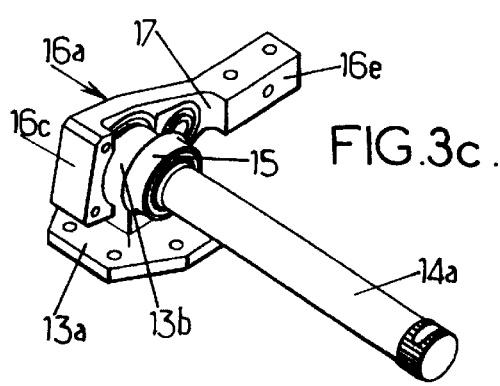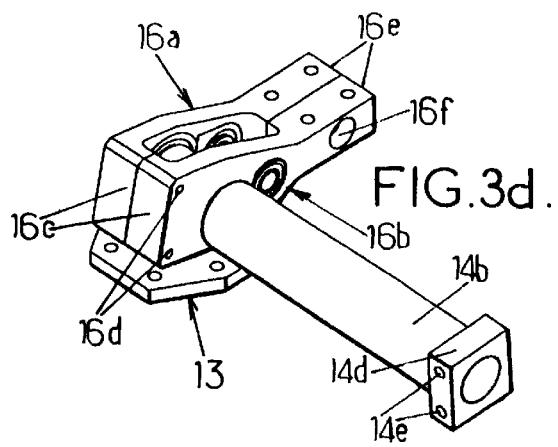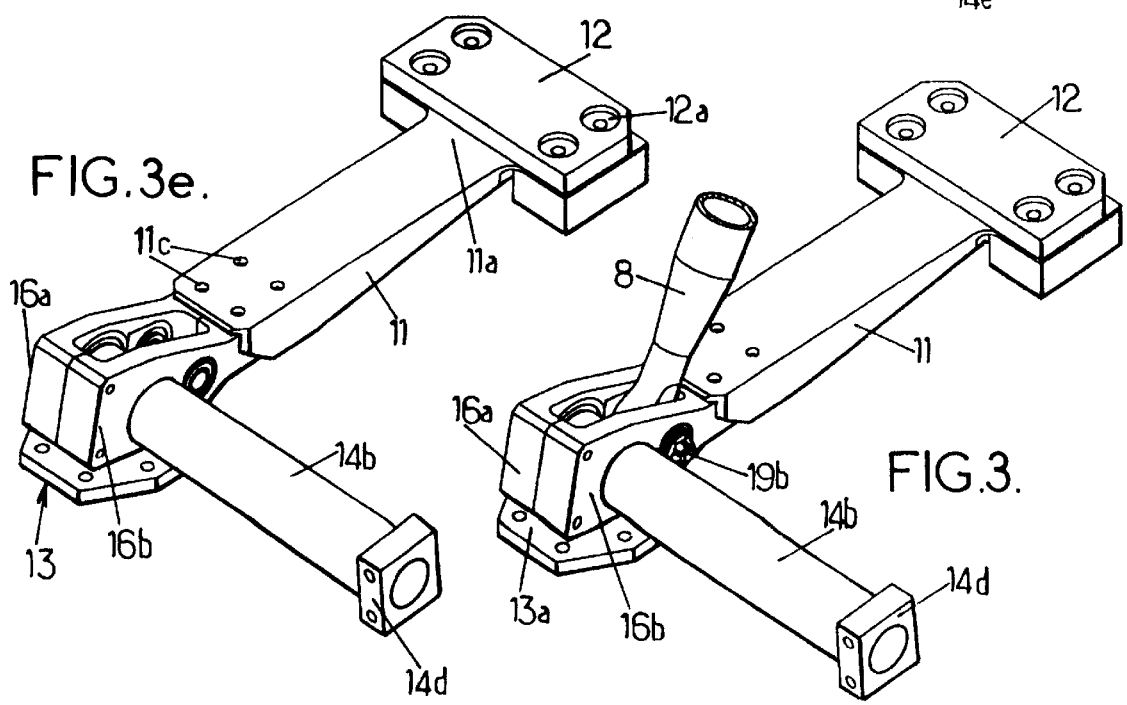

Figure 1:
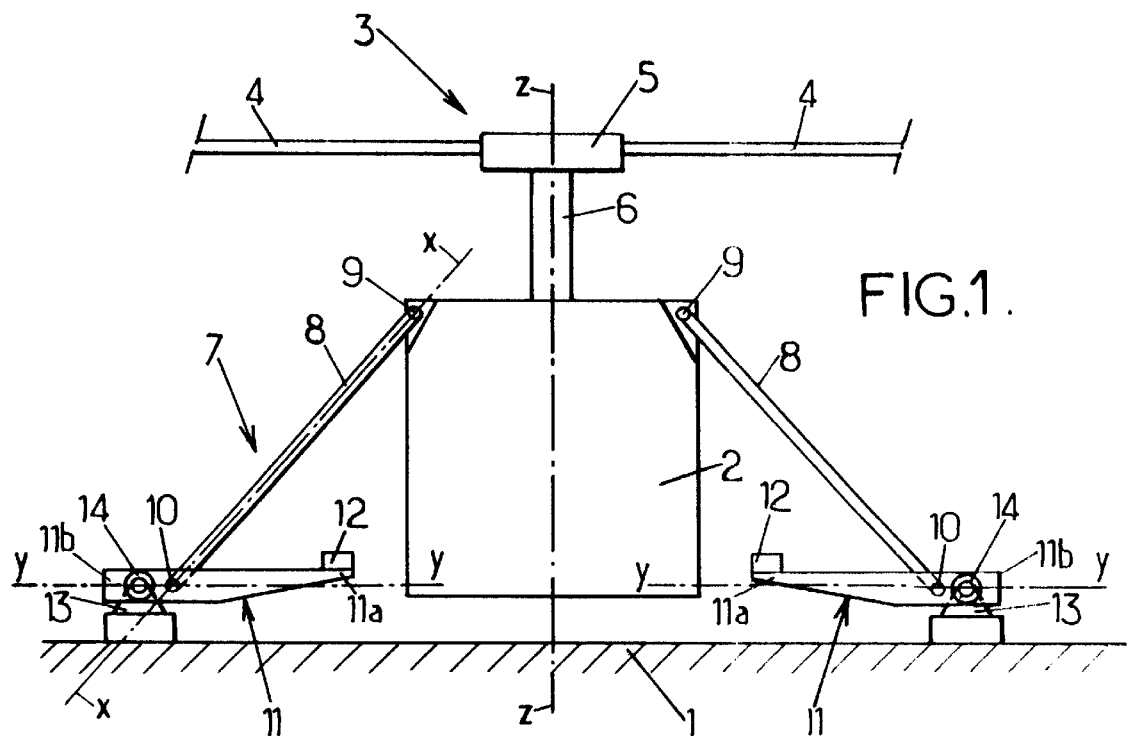

ANTI-VIBRATION SUSPENSION DEVICE WITH TORSION SPRINGS BETWEEN VIBRATORS AND STRUCTURE, FOR A HELICOPTER

The invention relates to an anti-vibration or anti-resonating suspension device for a main rotor of a helicopter, comprising a rotor mast driven in rotation by means of a main gearbox about the axis of the mast which is the axis of rotation of the rotor.

An anti-vibration suspension device of this type is designed to be mounted on a helicopter, the structure of which supports, in general, on a mechanical floor on top of the fuselage, motor-driven propulsion components, the main rotor and the main gearbox, acting as a gear and located between the motor-driven propulsion components and the main rotor in order to drive the latter in rotation. An anti-vibration suspension device of this type is therefore inserted between the main gearbox and the helicopter structure, on the one hand to transmit static forces and torques, acting on the rotor, between the rotor and the structure and, on the other hand, to provide an effective damping or filtering action of the dynamic components of the forces and torques acting on the rotor and in particular the dynamic component of the force directed along the rotor axis (pumping) and the forces and torques excited in the plane of the rotor.

The invention relates more specifically to an anti-vibration suspension device of the type comprising a set of at least three oblique bars for supporting the gearbox on the structure of the helicopter, these oblique bars being distributed around the gearbox and inclined relative to one another on the side of their top ends, these oblique bars being articulated, on the one hand to the gearbox by means of their top ends, and on the other hand to the helicopter structure by their bottom ends and by means of levers, a same number of these being provided as there are oblique bars, each lever supporting at least one vibrating weight at one end and being pivotably joined to the structure by its opposite end part, in the vicinity of which the bottom end of a corresponding oblique bar is pivotably mounted on the corresponding lever, the joints linking each lever to the structure and to the corresponding oblique bar being articulated joints which pivot at least about pivot axes substantially perpendicular to a corresponding plane passing through the longitudinal axis of the corresponding oblique bar and the vertical projection of said longitudinal axis onto said structure.

Suspension devices of this type are known from U.S. Pat. No. 4,458,862 and U.S. Pat. No. 4,431,148, in which each oblique bar is articulated at its top end directly on the upper part of the gearbox and at its bottom end at the outer radial end, relative to the rotor axis, of one of a respective number of arms, equal in number to the number of oblique bars, and arranged radially around the base of the gearbox to which these arms are linked. Each arm is pivotably mounted on the structure in the region of its external radial end, which is rigid, and to which the corresponding lever is attached or made integral by its end opposite that supporting the corresponding vibrating weight.

In U.S. Pat. No. 4,458,862, the arms are substantially co-planar radial extensions of the central part of a suspension plate of the gearbox on the structure, this central part being joined to the base of the gearbox, and the arms, arranged in a star design around this central part, being rigid in their plane but flexible in a direction perpendicular to this plane, i.e. in the direction of the rotor axis. Accordingly, each arm constitutes a flexible blade between the central part of the plate fixed to the gearbox and the rigid, external radial end-part of the arm which is pivotably mounted on the structure and on the bottom end of the corresponding oblique bar, and to which is attached or with which is integral the end of the lever at the end opposite the vibrating weight, the lever being oriented substantially radially either towards the interior (towards the rotor axis) or towards the exterior. The articulated joints of each arm permit deflections thereof by deformation in a direction perpendicular to the plane of the part thereof forming a flexible blade, and the unit comprising the corresponding lever and its vibrating weight form an anti-resonance or vibrating system, acting by inertia, and building up inertial forces which counterbalance the reactions at the linkage points to the structure corresponding to the deformations of the flexible blades of the plate.

U.S. Pat. No. 4,431,148 proposes an anti-resonant suspension device of this type which is simplified due to the fact that the suspension plate is independent of radial arms and comprises a thin membrane, which deforms by bending when subjected to forces exerted perpendicularly to its plane or pivoting moments exerted around its centre by the gearbox but is rigid under the effect of traction/compression when subjected to forces and torques exerted in its plane, such as the torque in reaction to the rotor driving torque, this membrane being integrated in the upper structure of the fuselage.

As a result, each radial arm is directly linked to the base of the gearbox by means of a support bearing, which not only provides a pivot axis perpendicular to the radial plane containing this arm but also a flexible link which imparts a certain freedom of movement to the arm, both at an angle and longitudinally, for example a laminated bearing with combined support spherically and in translation.

Each radial arm may be made from a single piece having a flexible part on the one hand and, on the other hand, a rigid part at points of which the arm is pivotably mounted on the corresponding oblique bar and on a corresponding structural bearing, and to which the lever comprising the support for the corresponding vibrating weight is attached. In a preferred embodiment of the above-mentioned patent, however, each radial arm is formed by a flexible radial blade and by a rigid part of a lever, the other part of which constitutes the support for the corresponding vibrating weight, the outer radial end (relative to the rotor axis) of the blade being secured to the lever in the region where the latter is pivotably mounted on the structural bearing of the fuselage.

This design involves using a complex laminated support bearing to provide the link between the inner radial end of each flexible blade to the gearbox, which fulfills a ball joint function and permits parasitic movement of the inner end of the flexible blade along its longitudinal axis when the blade is deformed due to bending.

This arrangement also involves using flexible blades which are difficult to design in terms of dimension and manufacture. Furthermore, the mounting between the lever and the corresponding radial arm can cause problems due to fretting.

The underlying problem of the invention is to simplify an anti-vibration suspension device of this type, in particular by dispensing with blades which flex under bending and also their complex support bearing on the base of the gearbox, thereby achieving very substantial savings on manufacturing, fitting and maintenance costs.

Another objective of the invention is to propose a simplified anti-vibration suspension device which is still compatible with the use of a membrane as proposed in U.S. Pat.

No. 4,431,148 in order to absorb the reaction to the driving torque and the forces acting on the base of the gearbox whilst securing the requisite degree of freedom in terms of pumping and rotation, the simplified device proposed by the invention simultaneously and advantageously being compatible with mono- or bi-directional suspensions comprising a pair of identical and parallel rod linkages pivotally mounted between the base of the gearbox and the structure, as described in U.S. Pat. No. 5,782,430, and U.S. Pat. No. 5,788,182, bringing additional savings compared with using a membrane.

To this end, the invention proposes an anti-vibration suspension device of the type outlined above, which is characterised in that each lever is also linked to the structure by at least one torsion spring, biased about a torsion axis that is substantially parallel with said pivot axes of said lever on the structure and on the corresponding oblique bar.

The advantage of a device of this type is that each flexible blade used in devices of the prior art can essentially be replaced by at least one torsion spring, which is much easier to dimension, manufacture, fit and maintain than the components which the torsion spring or springs replace, thereby simplifying the architecture of the device.

Another advantage of a device of this type is that it dispenses with the complex support bearing needed with the devices of the prior art to join the flexible blades to the gearbox.

In order to ensure appropriate loading of the torsion spring or springs by the angular deflections of the vibrator constituted by each lever and the corresponding at least one vibrating weight, it is of advantage if the torsion axis of said at least one torsion spring is substantially merged with the axis about which the lever pivots on said structure.

In order to obtain balanced loading on a level with each sub-assembly, comprising an oblique bar and the corresponding lever with its vibrating weight or weights and its torsion spring or springs, and/or increase the stiffness of the sub-assembly and/or reduce its size whilst producing a same degree of stiffness, it is also of advantage if the corresponding lever, and preferably each of them, is joined to the structure by two torsion springs, each protruding laterally from one side of the lever respectively.

In a first embodiment, for at least one lever and preferably for each of them, said at least one torsion spring comprises at least one elongate torsion member, of the torsion bar or tube type, an outer end of which relative to the lever is fixed to the structure whilst the other end, being the inner end relative to the lever, is fixed in motion to said lever.

In a simple and practical manner, the torsion spring or springs cooperating with at least one lever may comprise one or more tubes and/or bars acting under torsion, in series if each torsion spring comprises at least two tubes and/or torsion bars, for example machine-turned tubes which are very easy to manufacture, and constitute the elastically deformable elements of the device. However, this layout has a disadvantage in that it increases the number of points of attachment to the structure since one each is required for the articulated mounting of each lever on the structure as well as another at the outer end of each corresponding torsion spring.

Advantageously, in a second embodiment which allows the number of points of attachment to the structure and/or the transverse space required (relative to the longitudinal axis of a lever) by the torsion spring or springs cooperating with this lever to be reduced, at least one torsion spring is a double spring comprising an outer torsion tube and an inner, elongate torsion member, of the torsion bar or tube type, which is at least partially inserted in the outer torsion tube, coaxial with said torsion axis, one of said torsion tube and member having an end part joined in motion to said lever, whilst the other of said torsion tube and member has an end part fixed to said structure, the opposite end-parts of said torsion tube and member being joined in motion to one another.

In accordance with an advantageously simple and practical architecture, at least one lever and preferably each of them is pivotably mounted on the structure, being mounted so as to pivot on an attachment fitting which is rigidly fixed to the structure, and is joined to said attachment fitting by at least one double torsion spring, projecting laterally from a side of the lever and the attachment fitting, and the outer ends, relative to said lever and said attachment fitting, of said outer torsion tube and inner torsion member of said double torsion spring are fixed to one another. In a first variant, for at least one lever and preferably for each of them and for at least one double torsion spring, said double torsion spring is such that the inner ends, relative to said lever and said attachment fitting, of its outer torsion tube and its inner torsion member are joined in motion respectively to said lever and said attachment fitting. In a second embodiment which offers higher rigidity in the outer torsion tubes if necessary, for at least one lever and preferably for each of them and for at least one double torsion spring, said double torsion spring is such that its outer torsion tube and its inner torsion member are joined in motion to said attachment fitting and said lever respectively at their inner ends, relative to said lever and said attachment fitting. This architecture in these two variants therefore has only one attachment fitting per vibrator and the torsion spring or springs linking this vibrator to the structure.

In one advantageous embodiment which is very simple and practical to produce on an industrial scale and which is very effective, this attachment fitting supports a pivot shaft having two shaft sections coaxial with the pivot axis of the corresponding lever on the structure, each projecting laterally from a respective side of said attachment fitting, on which the lever is pivotably mounted by means of two rigid side plates, each being guided in rotation on one of the respective pivot shaft sections of the attachment fitting assisted by one of two respective laminated, conical bearings, of a known structure, having at least one frustum-shaped elastomer layer between two rigid collars, an outer and an inner collar, of each bearing.

In the first variant of this embodiment, in order to simplify the design of the attachment or structural fitting, it is of advantage if, for at least one lever and for at least one corresponding double torsion spring, the inner torsion member of said double torsion spring is coaxially fixed at an end of a pivot shaft section fixed to a mounting fixture of the structural fitting.

Simultaneously, there is also an advantage in that, for this lever or this corresponding double torsion spring or springs, the outer torsion tube is fixed to a side plate of the lever and projects out laterally on said side plate.

An advantage of the above-mentioned second variant of this embodiment is that for at least one lever and for at least one corresponding double torsion spring, the inner torsion member is fixed to a side plate of the lever and projects out laterally on this side plate, and it is also of advantage if, preferably simultaneously and again for at least one lever and for at least one corresponding double torsion spring, the outer torsion tube is fixed by its inner end to an auxiliary mounting fixture of the attachment fitting, which has a main mounting fixture supporting the pivot shaft.

Furthermore, in order to prevent fretting between the above-mentioned bearings and the attachment fitting, it is of advantage if, for at least one lever, one but preferably each of the two laminated conical bearings, by means of which the side plates of the lever are pivotably mounted on the attachment fitting, has an inner collar with stop means co-operating with facing stop means on the attachment fitting in order to prevent said inner collar from rotating on the corresponding pivot shaft section on said attachment fitting.

In this architecture, in which each lever has two side plates pivotably mounted on the corresponding attachment fitting, even greater advantage is to be had if the bottom end of the corresponding oblique bar is pivotably mounted on said lever by a ball joint retained on a pivot pin mounted between the two side plates of said lever by means of two laminated conical bearings, each being housed in one of the respective side plates.

This being the case, it is also of advantage if at least one but preferably each of the side plates of said lever has two recesses, each receiving one of the two respective laminated conical bearings by which said side plate is pivotably mounted on the attachment fitting and on the corresponding oblique bar, each of the two laminated conical bearings having an outer collar with a flat portion in contact with the flat portion of the outer collar of the other bearing in order to prevent said outer collars from rotating.

To facilitate mounting of the vibrator and so that the fixing means for the two side plates are not subjected to much stress during operation, for at least one lever and preferably for each of them, the two corresponding side plates are secured facing one another, by a screw fitting for example, one against the other at an end of the lever opposite the end on which the corresponding vibrating weight is mounted, and such that the corresponding attachment fitting is partially encased between the two side plates. In addition, each of the side plates may also be secured to the corresponding end of the lever or, in another variant, may be made in a single piece with one of the two respective longitudinal halves of the lever, which are joined to one another by a screw fitting for example. Accordingly, the fixing screws for the two facing side plates are subjected only to the difference in stiffness between the outer torsion tube and the inner torsion member of the corresponding torsion spring or springs and very little load is therefore applied to these screws.

In order to allow the attachment fitting to be mounted in the correct position on the structure before assembling the other elements of each subassembly on the fitting, these comprising an inclined bar, a vibrator (lever and weight) and a torsion spring, the pivot shaft pivotably linking the lever to the attachment fitting is a nut and bolt assembly, the nut being immobilised in rotation about the torsion axis and, also preferably, being checked in one of the side plates of the lever to prevent displacement along the torsion axis.

The outer ends, relative to the lever, of the outer torsion tube and the inner torsion member of at least one double torsion spring are advantageously of substantially complementary shapes and are at least partially inserted one inside the other and secured to each other by appropriate mechanical means. In particular, the outer ends of the outer torsion tube and inner torsion member may be joined to one another by means of:

at least one screw extending substantially parallel with or transversely to the torsion axis and/or at least matching splines, substantially parallel with the torsion axis, some being provided in the internal face and the others in the external face of the outer ends of the outer torsion tube and the inner torsion member respectively and such that the splines locate with one another and/or at least one locking end-piece encasing said outer ends.

The outer end of the inner torsion member may also have an end flange projecting radially towards the exterior, relative to the torsion axis, and secured to an end flange, projecting radially towards the interior or to a base of the outer torsion tube, at its outer end, by means of screws substantially parallel with the torsion axis.

The outer ends of the outer torsion tube and the inner torsion member may also have, respectively, an internal face and an external face facing one another which have a cross section of a substantially polygonal shape, so that when they are inserted one inside the other these two outer ends are joined to one another, at least in rotation about the torsion shaft.

In order to make this design more robust, the outer end of the outer torsion tube may have an external face with a cross section of substantially the same polygonal shape as the internal and external faces of said outer ends of the outer torsion tube and inner torsion member respectively, and at least one locking screw can be screwed into said outer end of the outer torsion tube, crossing through this outer end, substantially perpendicular to facets of the external and internal faces of polygonal cross section and bearing against a facet of the external face of the outer end of the inner torsion member.

On the other hand, if in addition one at least of the internal and external faces of said outer ends of the outer torsion tube and the inner torsion member respectively is designed to have a truncated pyramid shape which converges towards the inner end of said torsion tube or member, the device may advantageously have at least one wedge-shaped keying block tapering towards said inner end and which is engaged, substantially in the direction of the torsion axis, between said internal and external faces of said outer ends and which has at least one flange, projecting substantially radially towards the exterior relative to the torsion axis, which is fixed by at least one screw substantially parallel with the torsion axis and screwed into said outer end of the outer torsion tube.

Furthermore, in order to reduce the transverse space required (relative to the axis of the rotor) by the device, each lever is advantageously oriented so that said corresponding at least one vibrating weight is radially inside the articulated joints, by which said lever is mounted on the structure and said oblique bar on the lever, and inside said torsion axis of said at least one corresponding torsion spring, relative to the axis of the rotor.

As a result, the suspension device proposed by the invention is easier to maintain since the flexible elements allowing the deformations and/or displacements substantially parallel with the rotor axis are arranged close to the oblique bars and are therefore readily accessible.

Figure 2:
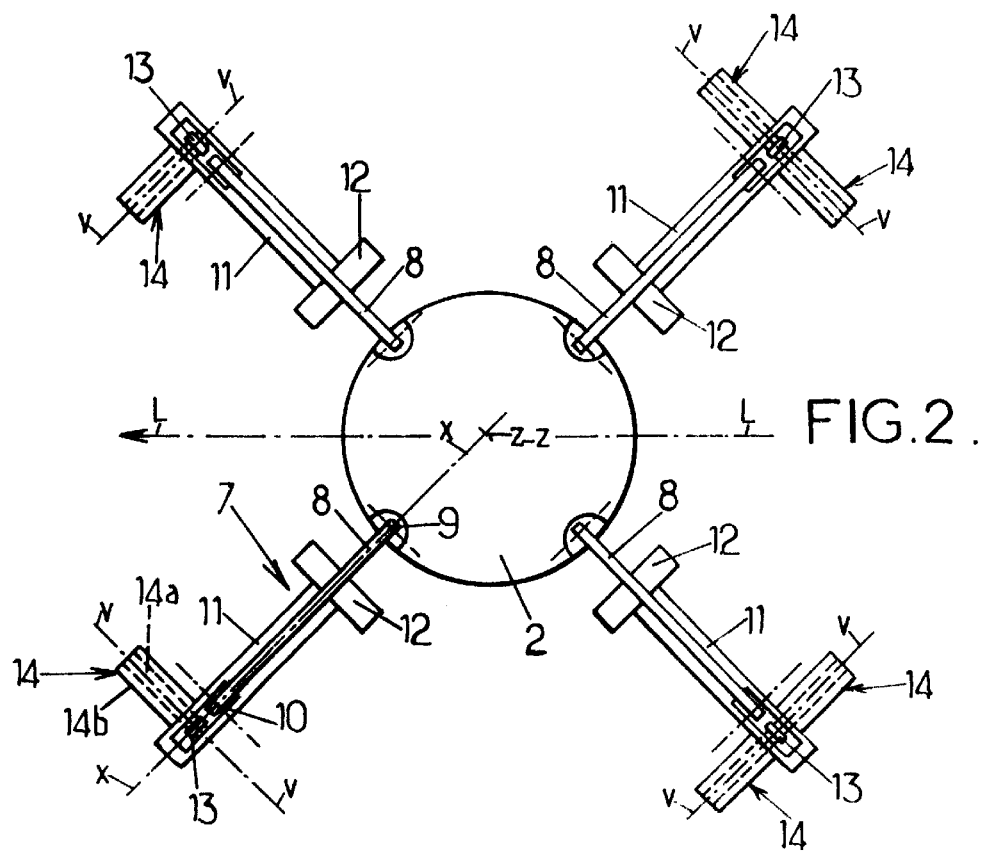
Figure 4:
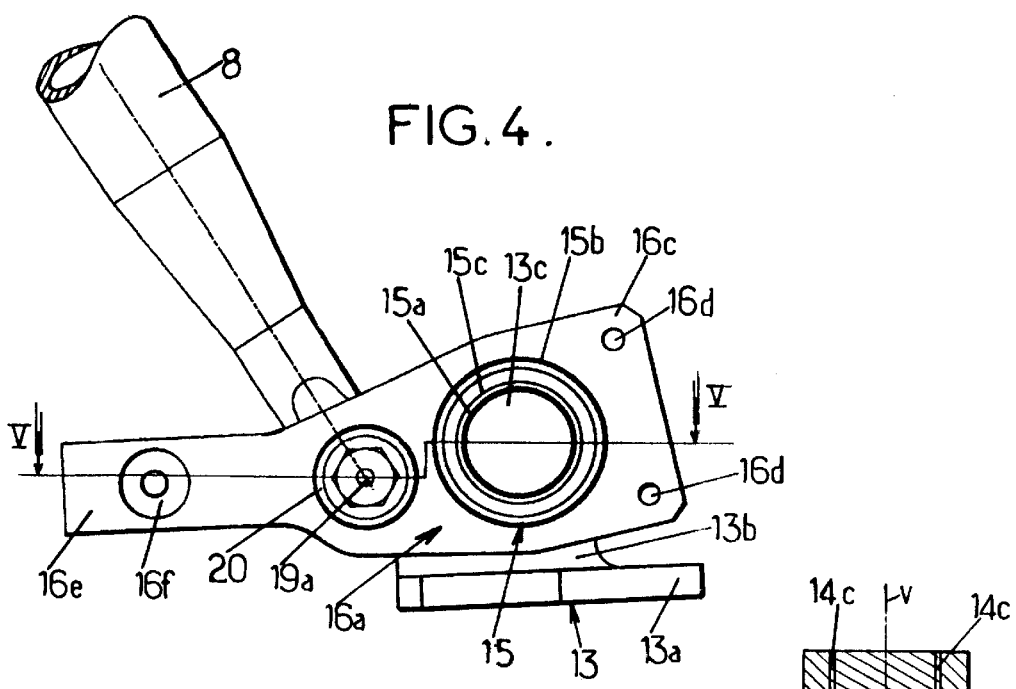
Figure 5:
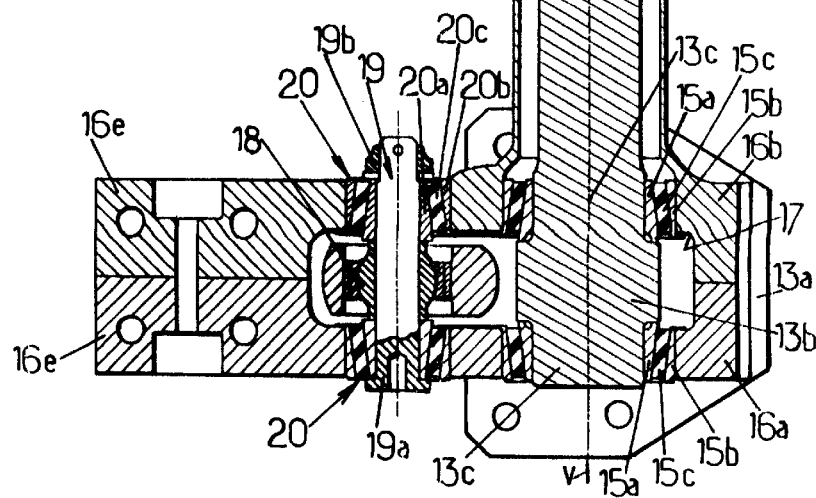
Figure 6:
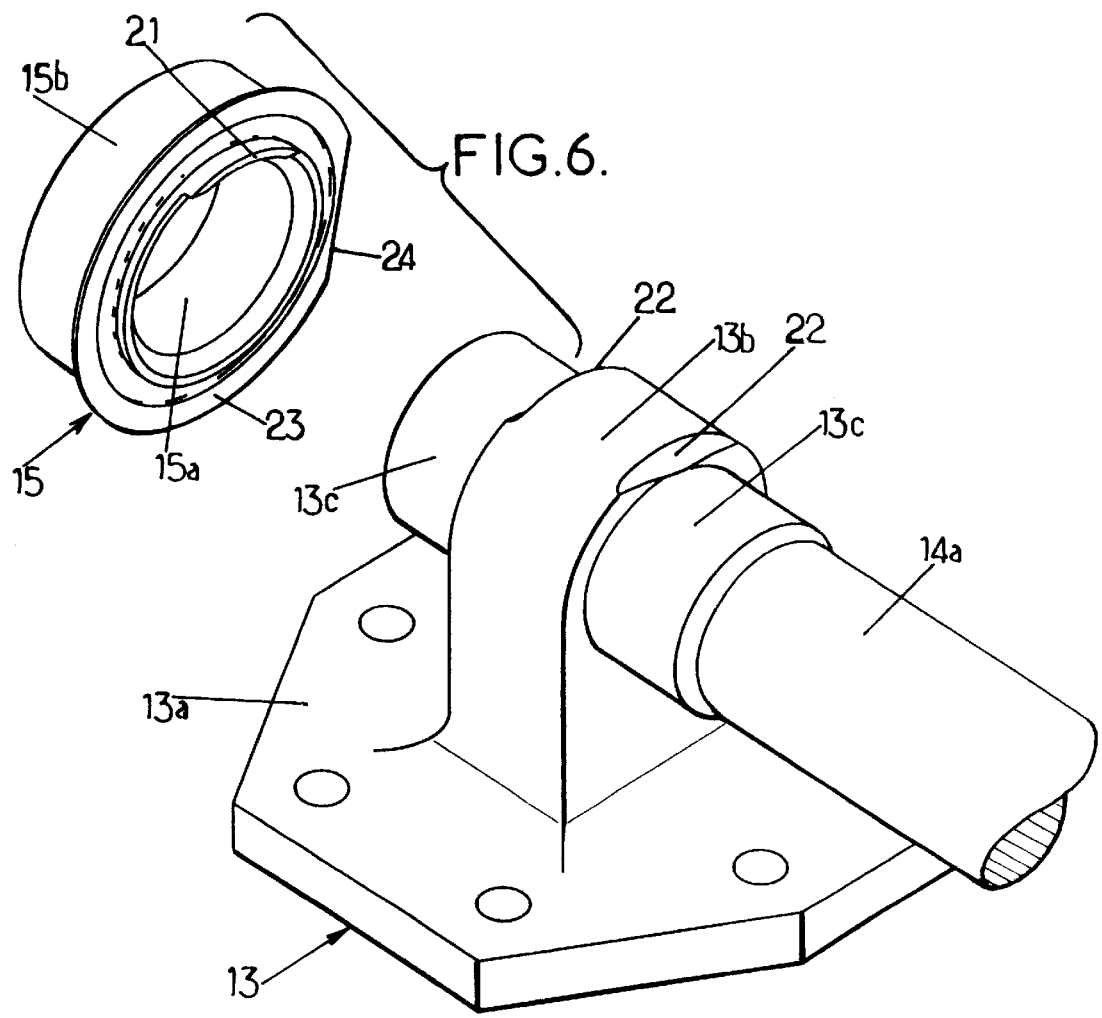
Figure 7:
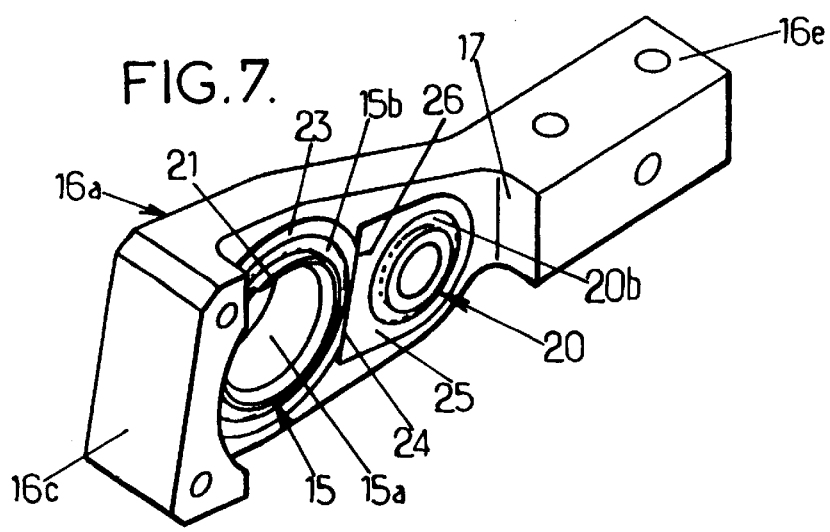
Figure 8:
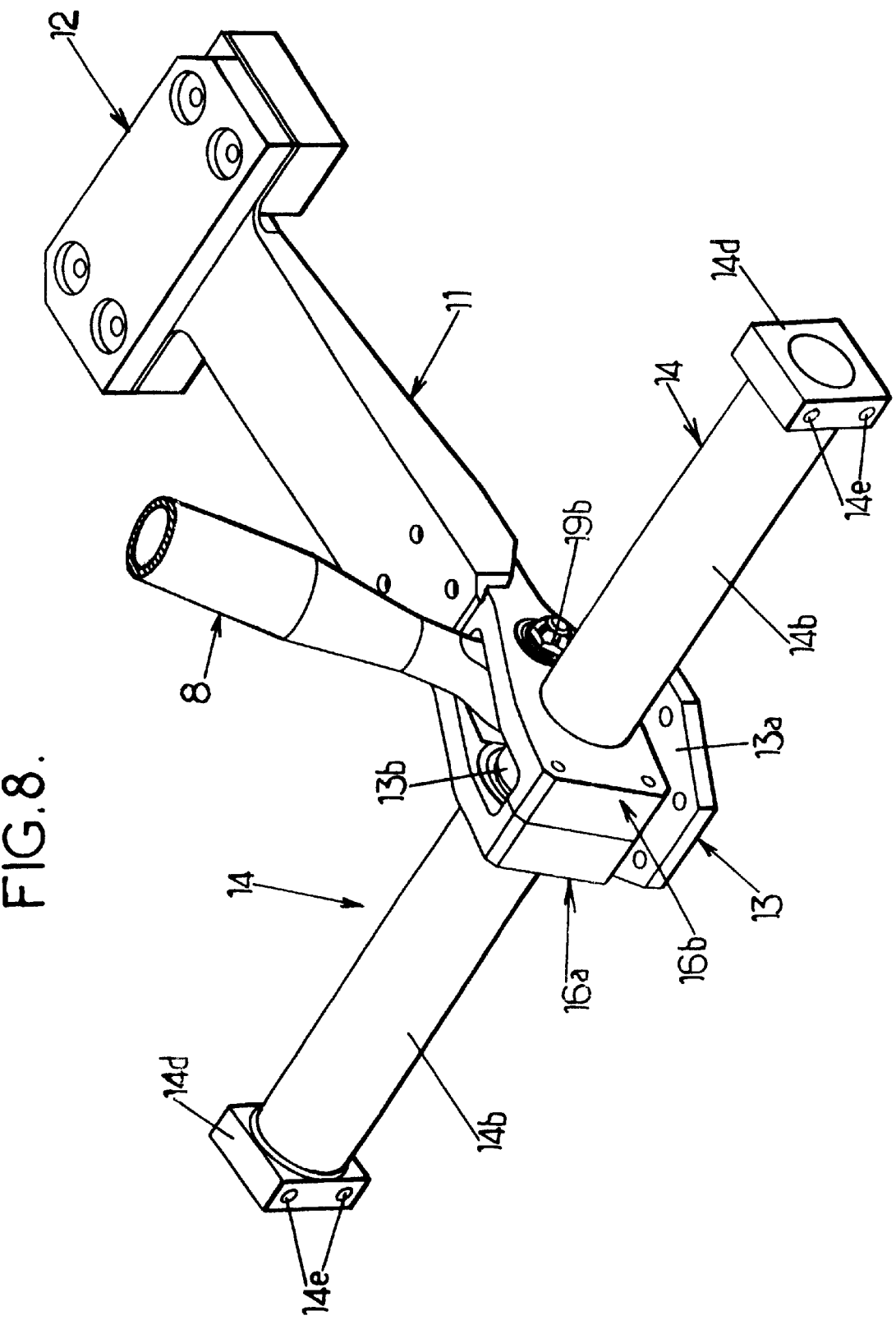
Figure 9:
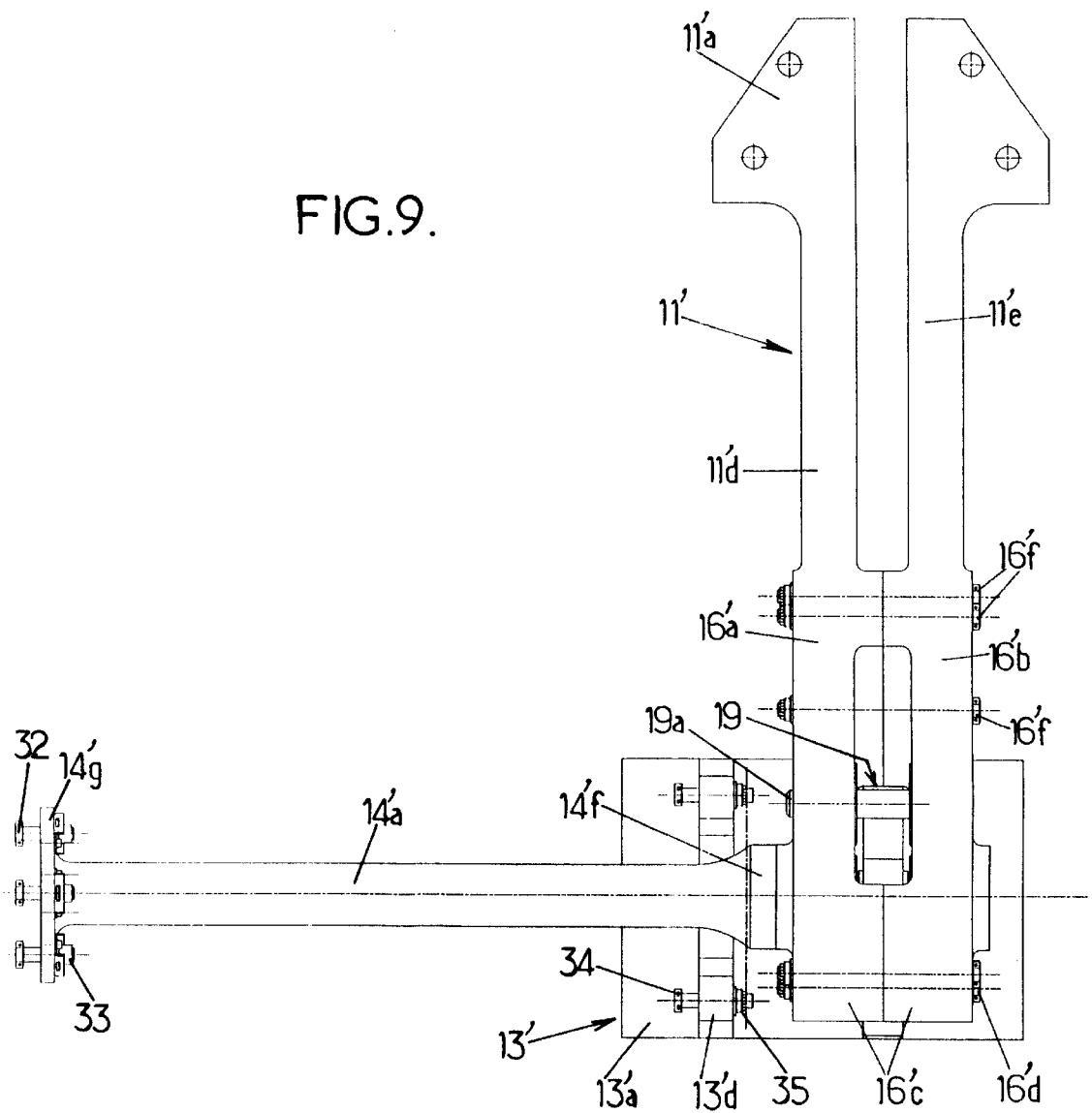
Figure 10:
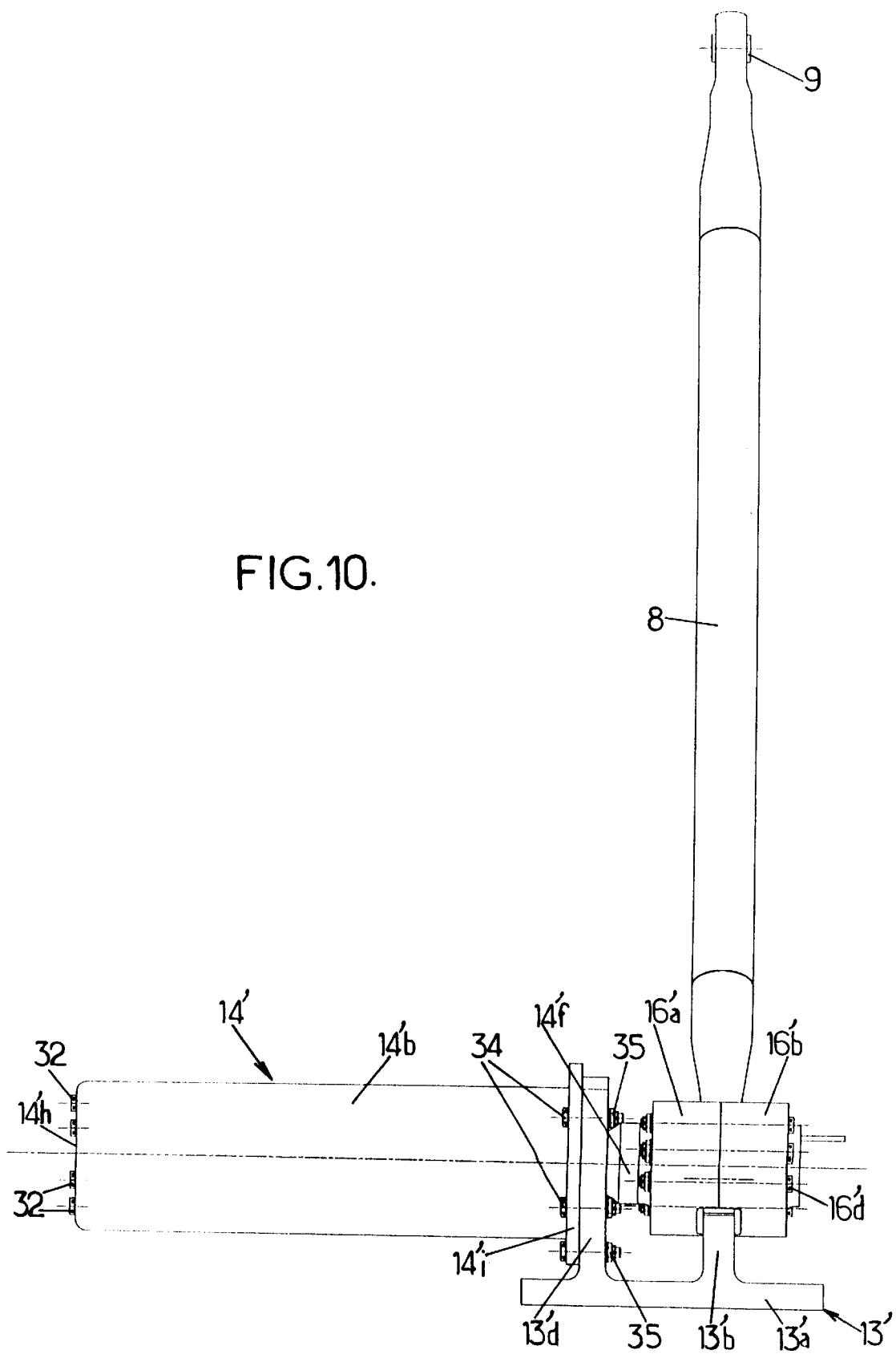
Figure 11:
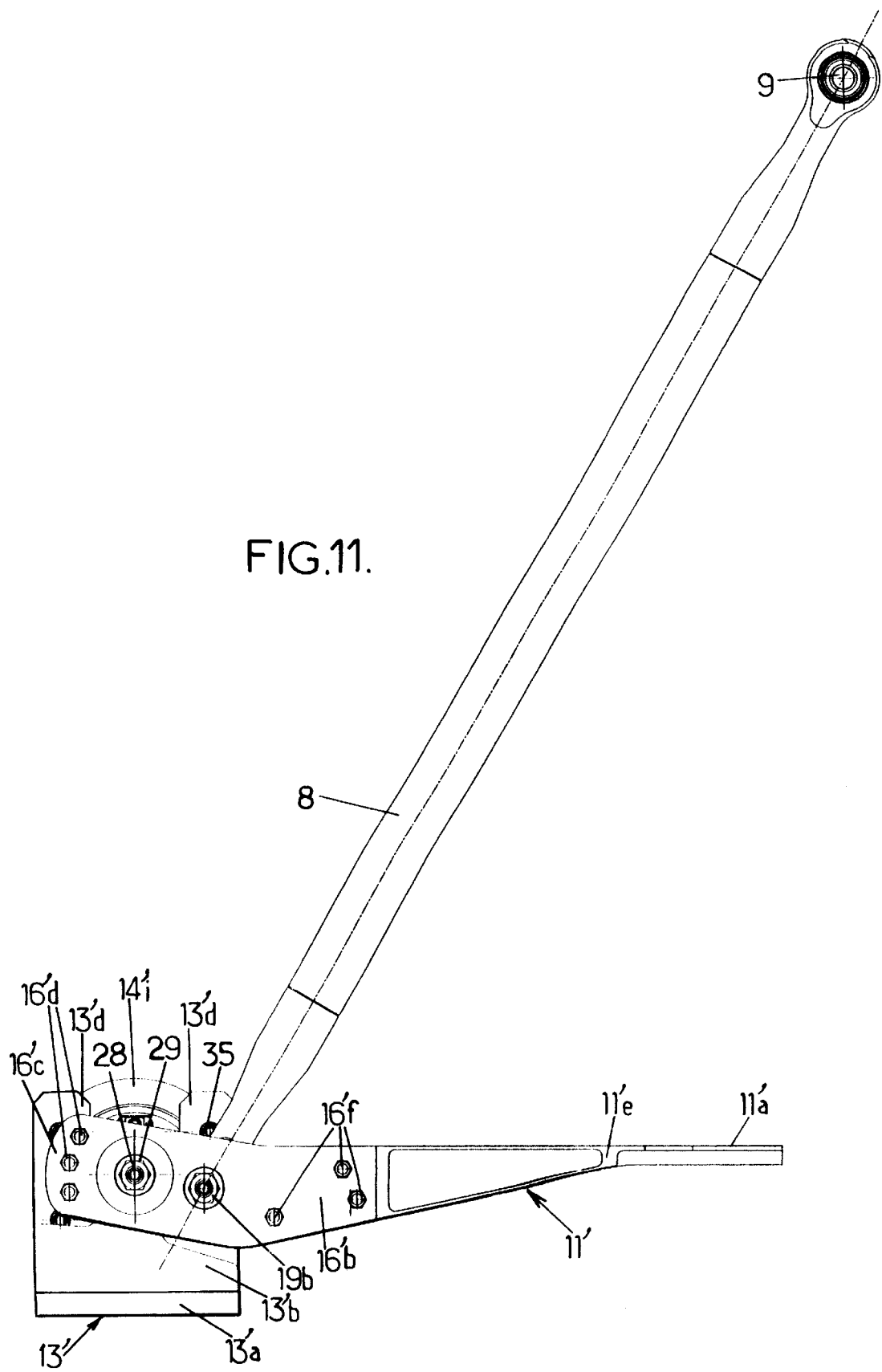
Figure 12:
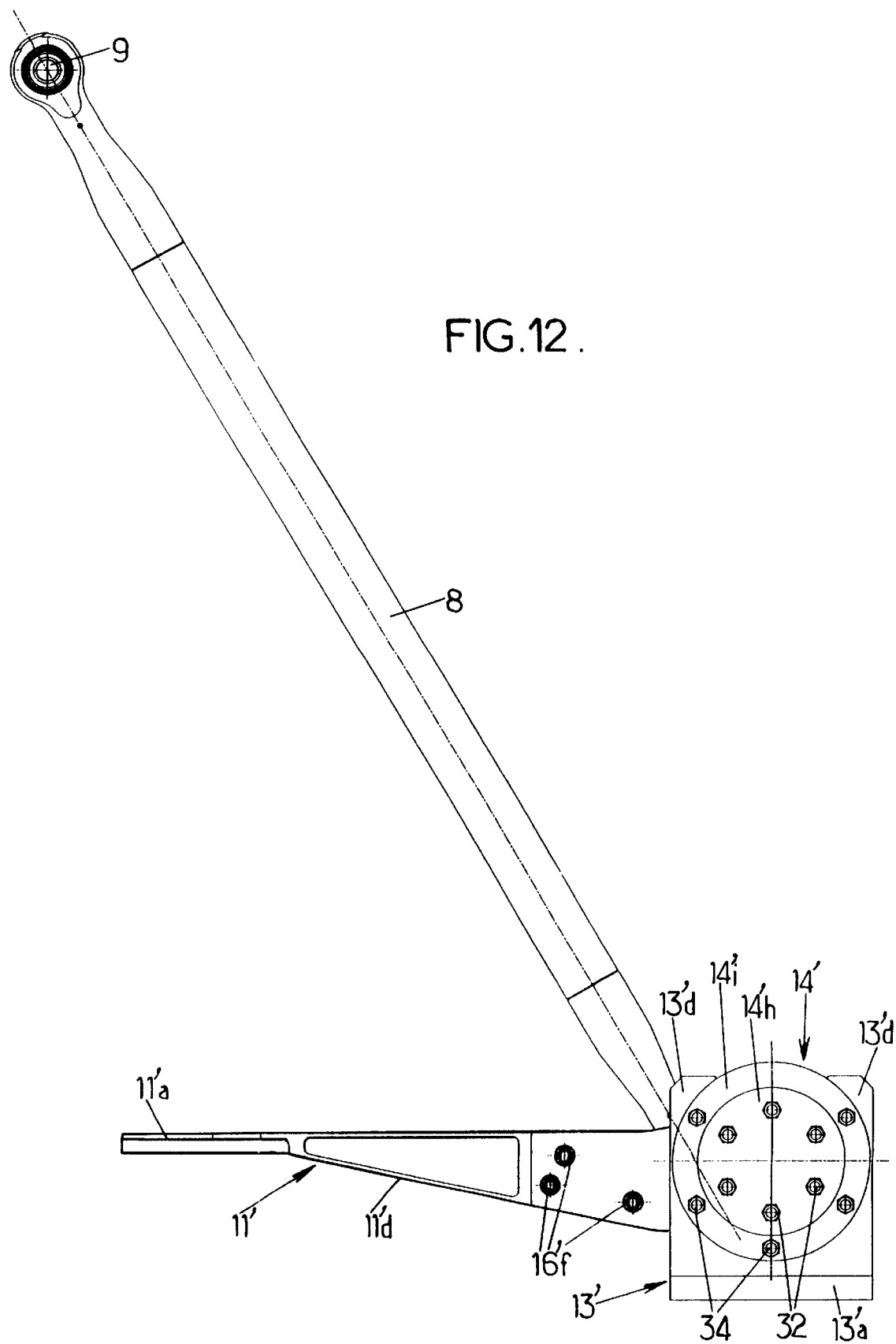
Figure 13:
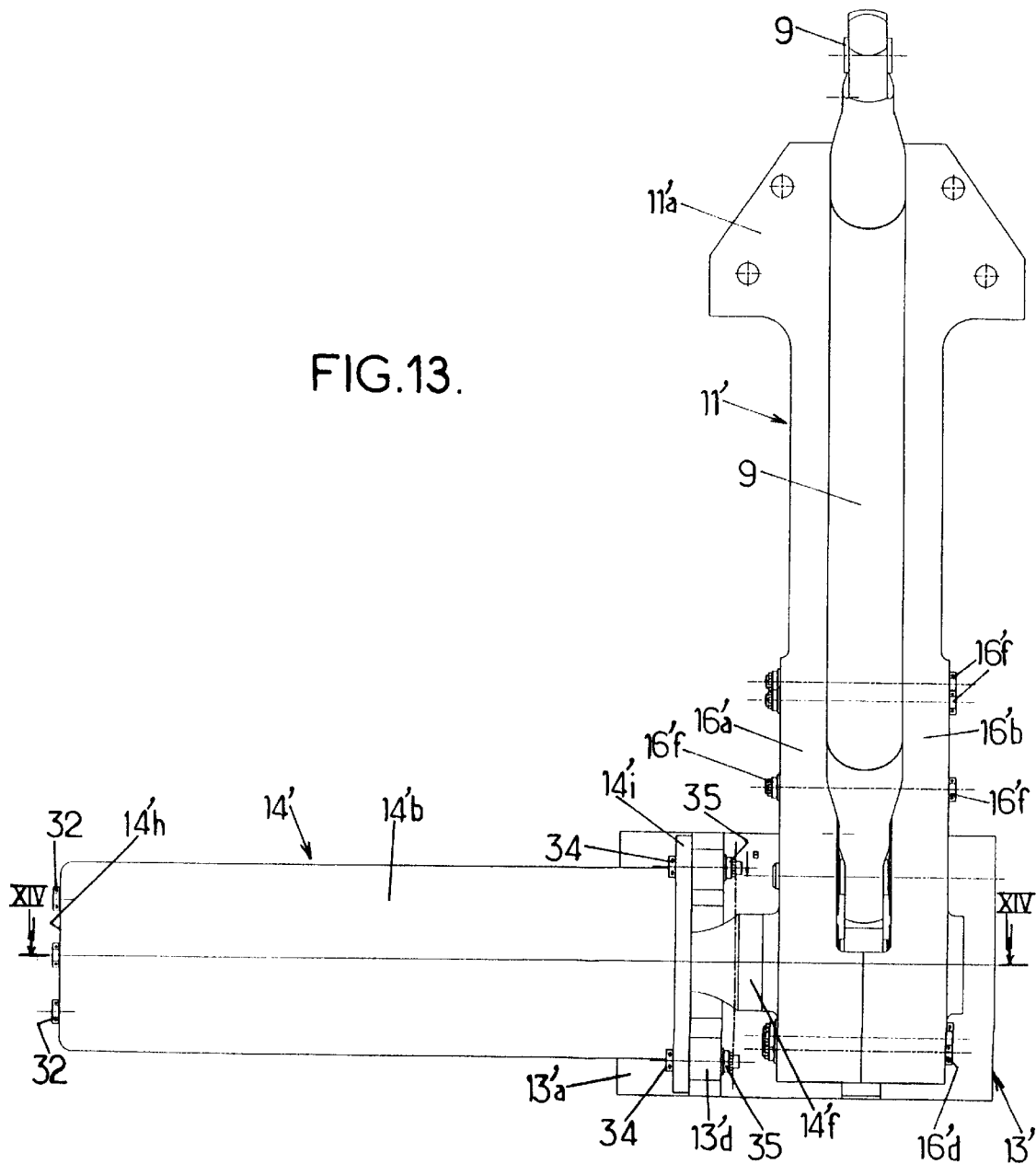
Figure 14:
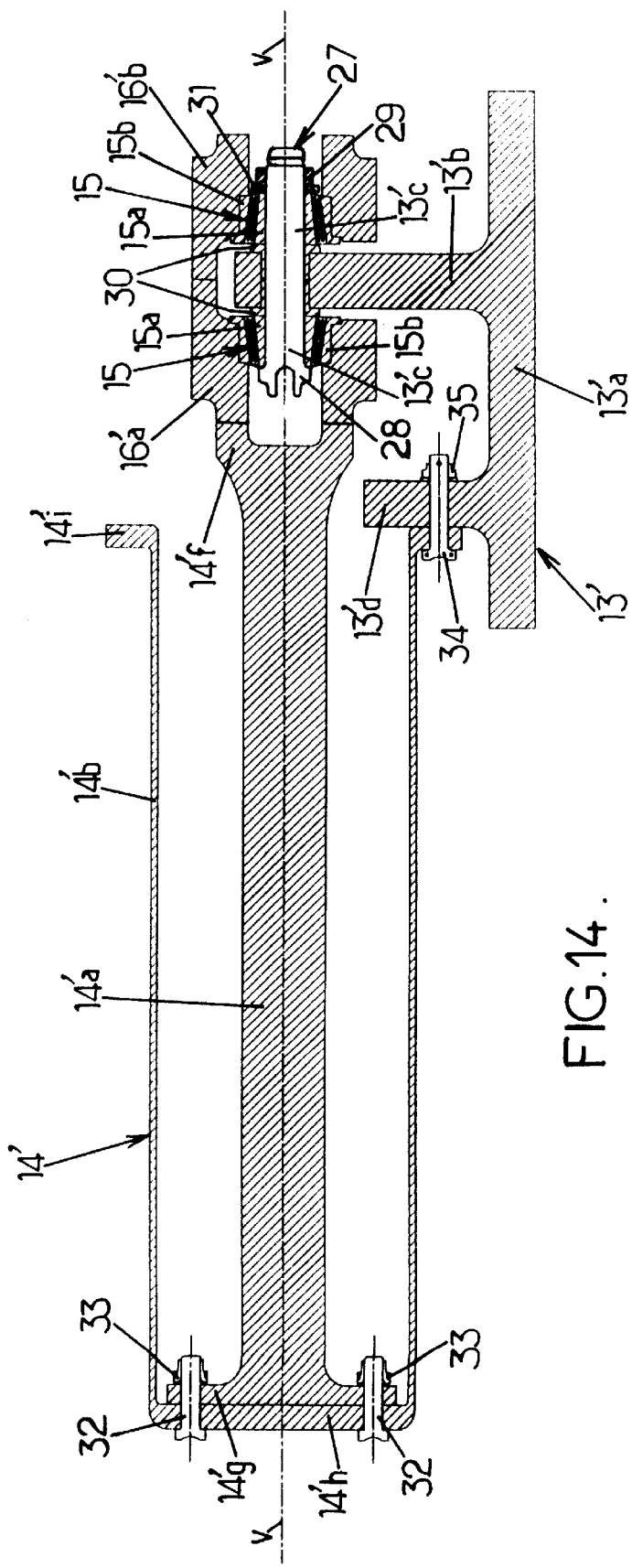
Figure 15:
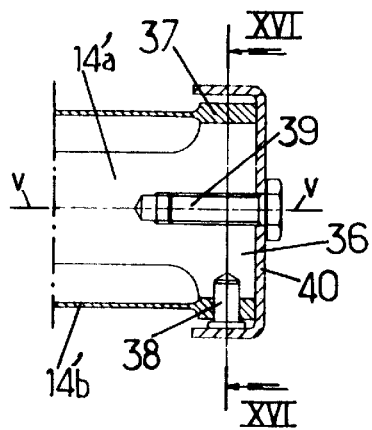
Figure 16:
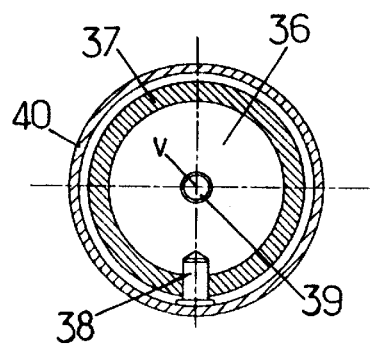
Figure 17:
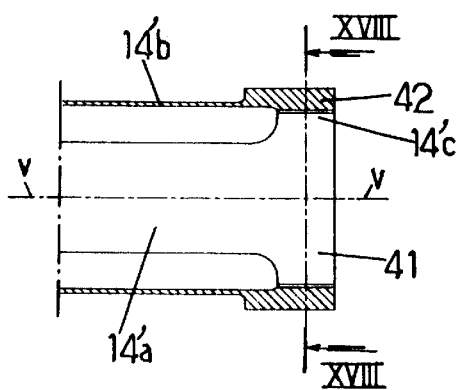
Figure 18:
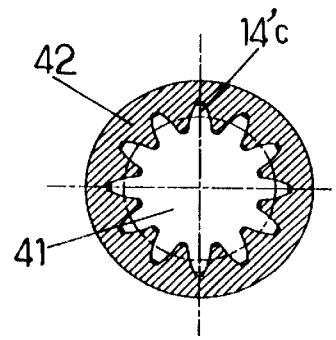
Figure 19:
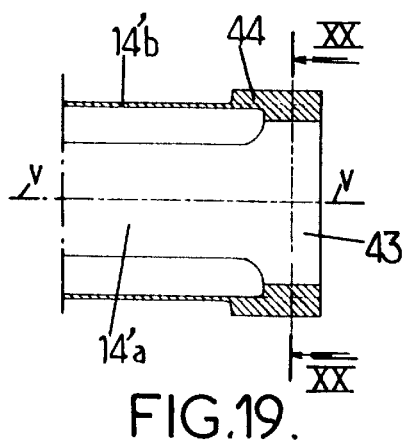
Figure 20:
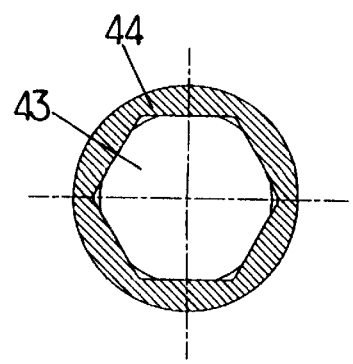
Figure 21:
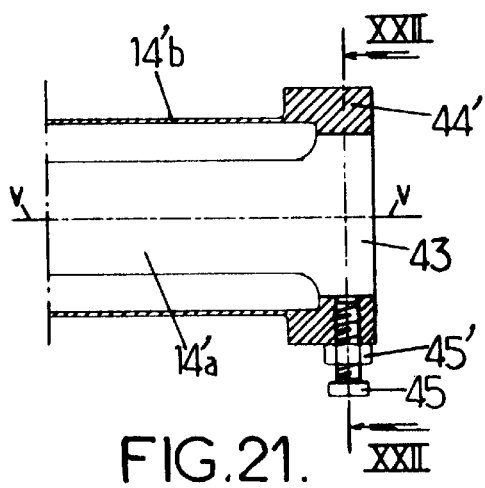
Figure 22:
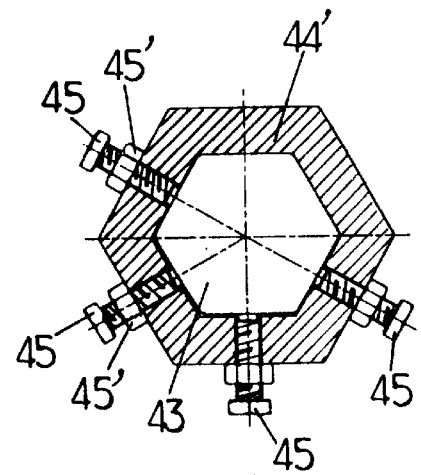
Figure 23:
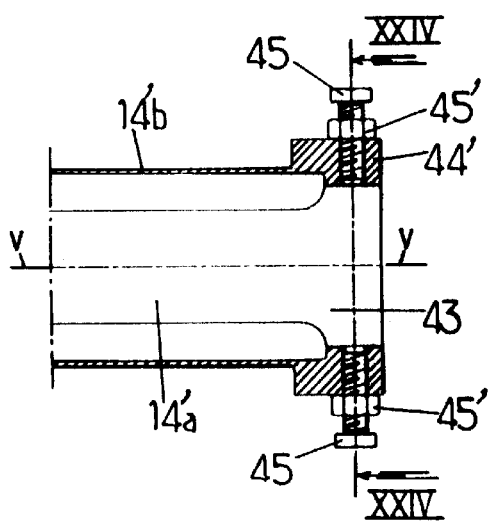
Figure 24:
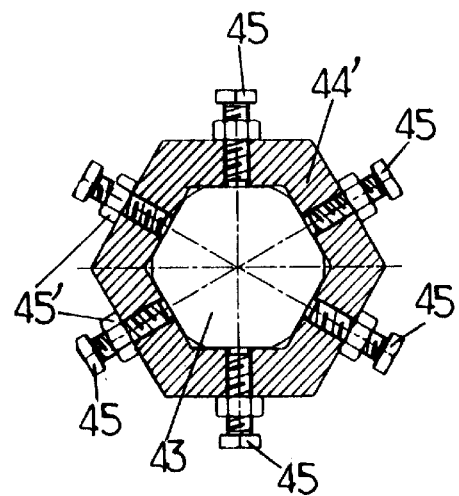
Figure 26:
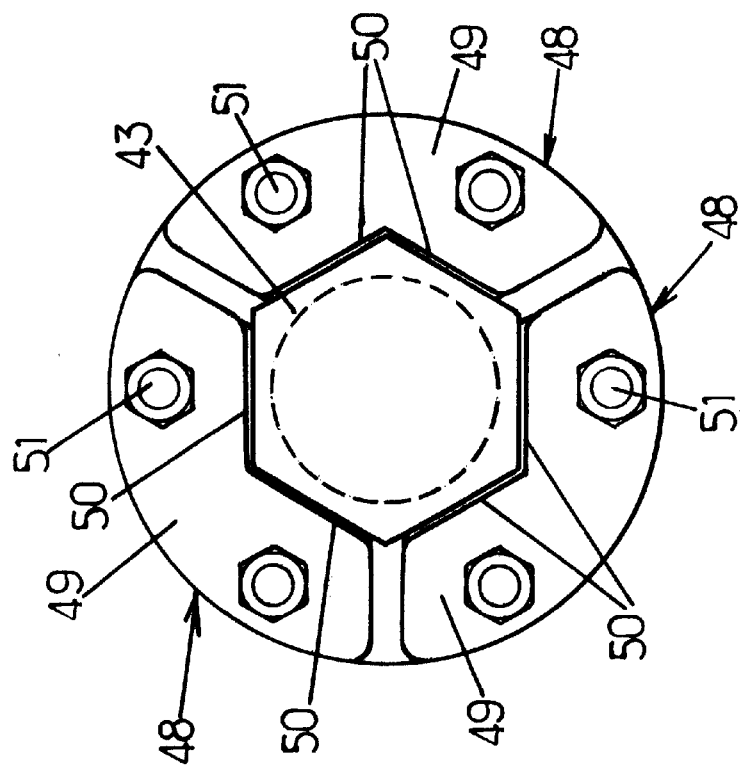
Figure 27:
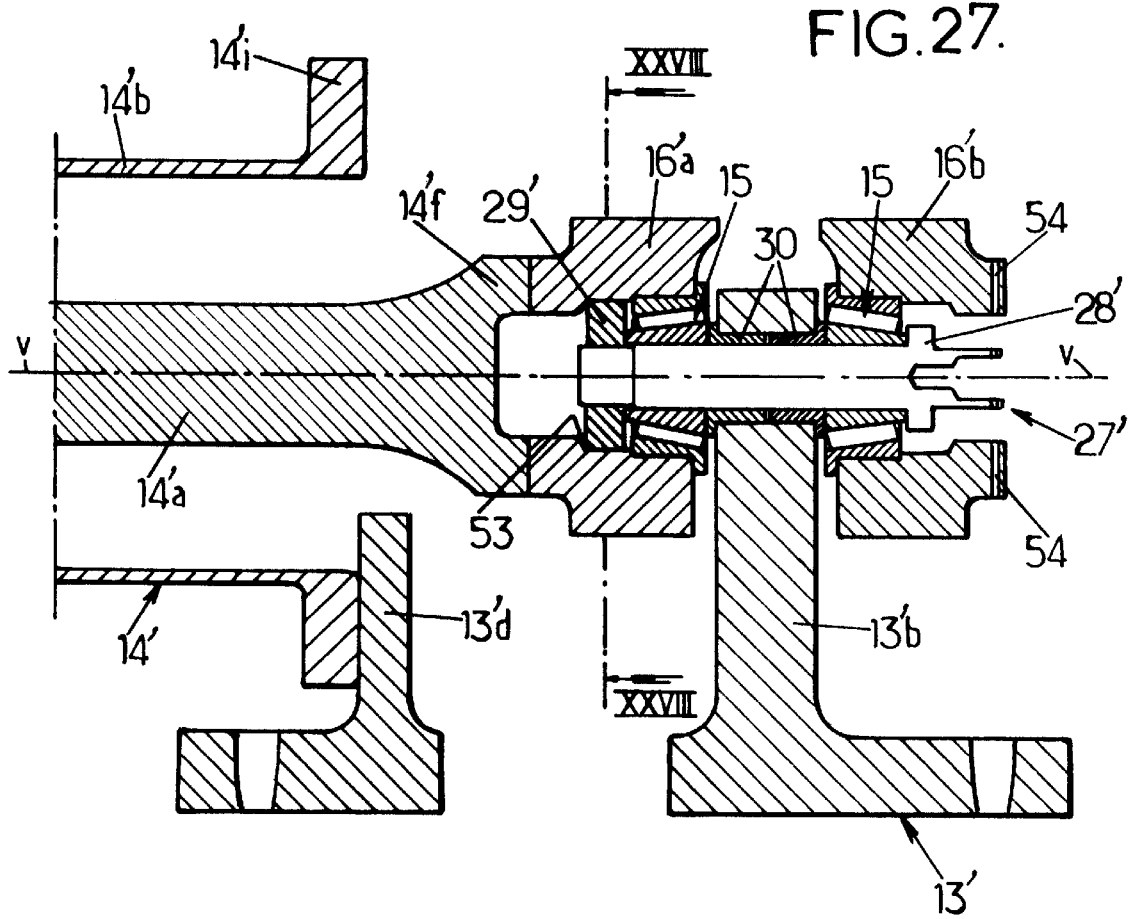

Other advantages and features of the invention will become clear from the description below, which is not restrictive in any respect, of examples of embodiments described with reference to the appended drawings, of which:

FIG. 1 is a schematic view in side elevation of an embodiment of the suspension device proposed by the invention, FIG. 2 is a schematic plan view of the device illustrated in FIG. 1, FIG. 3 is a partial schematic view, in perspective, of an embodiment of a sub-assembly of the device illustrated in FIGS. 1 and 2, the sub-assembly comprising a vibrator with a double torsion spring, being pivotably mounted on an attachment fitting and at the bottom end of a corresponding oblique bar, FIGS. 3a to 3e are views similar to that of FIG. 3 showing five successive steps involved in mounting the sub-assembly of FIG. 3, FIG. 4 is a view in side elevation of a part of the sub-assembly illustrated in FIG. 3, FIG. 5 is a view in section along the stepped plane V—V of FIG. 4, FIG. 6 is a perspective view similar to that of FIG. 3b, but on a larger scale, representing a preferred embodiment of the laminated conical bearings and an attachment fitting receiving these bearings, FIG. 7 is a perspective view of a preferred embodiment of a side plate of a lever co-operating with the laminated conical bearings and the attachment fitting of FIG. 6, FIG. 8 is a view similar to that of FIG. 3 of another example of a subassembly of the device illustrated in FIGS. 1 and 2, with two double torsion springs for each vibrator and oblique bar, FIG. 9 is a plan view of an embodiment of the sub-assembly illustrated in FIGS. 3 to 7 during the process of being assembled, FIGS. 10 to 12 are views in elevation from the front and laterally to one side and the other side respectively of the variant of the sub-assembly illustrated in FIG. 9 after it has been assembled but without a vibrating weight, FIG. 13 is a plan view of the variant of the sub-assembly illustrated in FIGS. 10 to 12, FIG. 14 is a view in section along the line XIV—XIV of FIG. 13, FIG. 15 is a schematic view, partially in longitudinal section and partially in side elevation, of a first embodiment showing how the outer lateral ends of the outer torsion tube and the inner torsion member are joined in the example of the sub-assembly illustrated in FIGS. 9 to 14, FIG. 16 is a schematic view in cross section along the line XVI—XVI of FIG. 15, FIGS. 17 and 18 are similar views to those of FIGS. 15 and 16 respectively showing a variation on the way the outer ends of the outer torsion tube and the inner torsion member are joined, FIGS. 19 and 20 are similar views to those of FIGS. 17 and 18 respectively showing a third variant of the way in which said outer ends are joined, FIGS. 21 and 22 are similar views to those of FIGS. 17 and 18 respectively showing a fourth variant of the way in which said outer ends are joined, FIGS. 23 and 24 are similar views to those of FIGS. 21 and 22 respectively showing a different approach to the linkage system illustrated in figures 21 and 22, FIGS. 25 and 26 are similar views to those of FIGS. 21 and 22 respectively showing yet another variant of the way in which the outer ends of the outer torsion tube and the inner torsion member are joined in the example of the sub-assembly illustrated in FIGS. 9 to 14, and FIG. 27 is a partial view similar to that of FIG. 14 showing a variant of the example illustrated in FIGS. 9 to 13, and FIG. 28 is a view in section along the line XXVIII—XXVIII of FIG. 27.

FIG. 1, is a schematic diagram of the primary structure 1 of the fuselage of a helicopter, on a level with a mechanical deck defined by this primary structure 1 above the helicopter cockpit, and designed to support motor-driven components (not illustrated), a main gearbox 2 and a main rotor 3.

The blades 4 of the rotor 3 are connected to a hub 5, joined in rotation to a rotor mast 6 driven in rotation about its longitudinal axis, which is the axis of rotation Z—Z of the rotor, by means of its base in the gearbox 2, provided in the form of a gear on the kinematic chain between the engine propulsion components and the mast 6, for driving the rotor 3 in rotation.

The gearbox 2 and the rotor 3 are suspended on the structure 1 by means of a suspension device 7, which filters the pumping excitations (along Z—Z) and the excitations due to forces and torques in the plane of the rotor 3. Similarly to the devices disclosed in U.S. Pat. No. 4,458,862 and U.S. Pat. No. 4,431,148, this suspension device 7 comprises a set of four rigid and oblique bars 8 substantially regularly distributed around the gearbox 2. Each bar 8 is straight and its longitudinal axis x—x defines, with the vertical projection of this axis x—x on structure 1, one of four respective half-planes which can be radial and passing through the axis Z—Z, and distributed about this axis Z—Z so that two half-planes are directed towards the front and towards the sides of the helicopter and the other two half-planes are directed towards the rear and towards the sides, each of the four half-lanes thus being inclined relative to the longitudinal axis L—L of the helicopter at an angle which depends on the points at which the bars 8 are connected onto the structure 1. This angle may be approximately 45° as illustrated by way of example in FIG. 2. However, if the connecting points on the structure are positioned at the intersections of two longitudinal structural spars with two main structural frames located one in front and the other behind the relatively wide side doors of a transport helicopter for example, so that the frames are spaced farther apart from one another than the spars, this angle may be approximately 28° for example.

The oblique bars 8 are inclined relative to one another in these half-planes towards their top ends and in particular may converge at a focal point located substantially on the axis Z—Z below or on a level with the hub 5, for example. Each oblique bar 8 is pivotably mounted at its top end by means of a ball joint 9 on the top part of the housing of the gearbox 2 and each bar 8 is also pivotably linked by its bottom end to the structure 1 via a straight, rigid lever 11, the longitudinal axis y—y of which extends in the plane of axis x—x of the bar 8 and its vertical projection onto the structure 1, for example substantially radially relative to the axis Z—Z in the same radial plane substantially containing the axis x—x of the oblique bar 8. This lever 11 supports a vibrating weight 12 at its end directed towards the axis Z—Z or inner radial end 11a, whilst at its opposite end part or outer radial end part 11b, the lever 11 is pivotably mounted on an attachment fitting 13 of the primary structure 1 of the fuselage so as to be able to swivel at least about a pivot axis substantially perpendicular to the plane containing the axes x—x and y—y of the oblique bar 8 and the lever 11.

The bottom end of each oblique bar 8 is pivotably mounted by means of a ball joint 10 on a zone of the lever 11 which is closer to the pivot mounting of this lever 11 on the structural fitting 13 than to the vibrating weight 12, this zone even being located in the immediate vicinity of the pivot mounting of the lever 11 on the attachment fitting 13, i.e. in the vicinity of the outer radial end part 11b of the lever 11, relative to the axis Z—Z.

Each mono-directional anti-resonant vibrator, constituted by a lever 11 with its vibrating weight 12, is therefore pivotably mounted on the bottom end of the corresponding oblique bar 8 and on the structure 1, at least so as to pivot about axes substantially perpendicular to the corresponding plane containing the axes x—x and y—y of the bar 8 and the lever 11 and in which the ball joints 9 and 10 about which the bar 8 pivots on the box 2 and on the lever 11 are centred.

The essential feature of the anti-vibration or anti-resonant device proposed by the invention is that each lever 11 is also linked to the structure 1 by at least one torsion spring 14 biased, when the box 2 is displaced along the axis Z—Z, about a torsion axis v—v substantially parallel with the pivot axes of the lever 11 on the bar 8 and on the fitting 13, hence also substantially perpendicular to the corresponding plane (x—x, y—y) and, in this example, this torsion axis v—v substantially merges with the pivot axis of the lever 11 on the attachment fitting 13.

Each torsion spring 14 extends so that it projects laterally from a side of the corresponding lever 11, substantially perpendicular to the longitudinal axis y—y of this lever 11, and is radially (relative to the axis Z—Z) to the outside of the ball joint 10 by which the lever 11 is pivotably mounted on the corresponding oblique bar 8 so that the corresponding vibrating weight 12 is radially to the inside of the torsion axis v—v of the torsion spring or springs 14 biased by this lever 11.

In FIG. 2, the axis L—L represents the longitudinal axis of the helicopter from the rear towards the front along the arrow on this axis and, by way of example, the two levers 11 to the front of the helicopter (on the left-hand side of FIG. 2) are each joined to the structure 1 by means of a single torsion spring 14 directed towards the axis L—L and towards the front of the helicopter, whereas each of the two levers 11 towards the rear of the helicopter (on the right-hand side of FIG. 2) is joined to the structure 1 by two torsion springs 14, symmetrical on either side of the corresponding lever 11.

However, the four sub-assemblies, each comprising a vibrator (lever 11 and weight 12), an oblique bar 8, an attachment fitting 13 and at least one torsion spring 14, which constitute the suspension device, may all have either one or two torsion springs 14, the two front sub-assemblies on the one hand and the two rear sub-assemblies on the other preferably being arranged symmetrically with one another relative to the longitudinal axis L—L.

If each lever 11 is joined to the structure 1 by two torsion springs 14, disposed laterally on either side of the lever 11 and symmetrical with one another relative to the longitudinal axis y—y of the lever 11, as is the case with the two rear levers 11 illustrated in FIG. 2, the symmetry of the structure and stress on the device will be favourable and, for a same overall stiffness under torsion, each of the two springs 14 can be of a smaller transverse dimension as compared with using a single torsion spring 14 for each lever 11, or, if the transverse dimension of the springs 14 is the same, the stiffness of a sub-assembly with two torsion springs 14 per lever 11 can be doubled compared with that of a sub-assembly having a single torsion spring 14 per lever 11.

The torsion spring 14 or each of the two torsion springs 14 bearing the load of relative displacements between a lever 11 and the structure 1 may be a simple spring consisting of an elongate torsion member such as a torsion tube or torsion bar, made from titanium for example and machined by turning, an inner end of which, directed towards the lever 11, is joined with this lever 11 in motion, whereas its opposite or outer end is joined to the structure 1, for example by a structural attachment (not illustrated). Two or three points of attachment to the structure 1 need to be provided for each sub-assembly, i.e. an attachment fitting 13, in order to provide the articulated link between the lever 11 and the structure 1, and one or two structural attachments, each providing a link for the outer end of an elongate torsion member to the structure 1, depending on whether the sub-assembly has one or two torsion springs 14 joined to the lever 11.

In a different embodiment, in order to dispense with structural fittings other than the attachment fittings 13 to provide the articulated link between the levers 11 and the structure 1, each torsion spring, such as 14 in FIGS. 1 and 2, may consist of two torsion springs in series in the form of a double torsion spring comprising a torsion tube inside of which at least one elongate torsion member is at least partially engaged, for example a torsion bar or another torsion tube. The outer torsion tube and the inner elongate torsion member are coaxial with the torsion axis v—v and the laterally outer ends (relative to the lever 11) of the outer tube and the inner torsion member are secured to one another whilst the laterally inner ends of the outer tube and the inner torsion member are secured respectively to the lever 11 and the attachment fitting 13, or, in an alternative embodiment, to a variant of the attachment fitting and to the lever respectively.

A sub-assembly with a lever 11 joined by a single double torsion spring 14 to the single mounting and articulation fixture of an attachment fitting 13, on which the lever 11 is pivotably mounted so as to pivot at least about the torsion axis (v—v), will be described below with reference to FIGS. 3, 3a to 3e, 4, 5, 6 and 7, whilst an example of a sub-assembly in which the lever 11 is joined to the single mounting fixture of the attachment fitting 13 by two double torsion springs 14 will be described below with reference to FIG. 8.

In the sub-assembly illustrated in FIG. 3, the attachment fitting 13 (see FIG. 3a) comprises a base plate 13a which is rigidly fixed to the mechanical deck of the structure 1 of the helicopter and which supports a single mounting fixture 13b at the centre, which in turn supports two cylindrical pivot shaft sections 13c, in a single piece with the fixture 13b, coaxially with the pivot axis of the lever 11 on the attachment fitting 13 and torsion axis v—v, which merge, each of the shaft sections 13c projecting laterally from a side of the fixture 13b respectively. One of the shaft sections 13c is coaxially extended at one end by an elongate torsion member, in the form of a torsion bar 14a, although a torsion tube may also be used. This torsion bar 14a, which is cylindrical, is secured to the mounting fixture 13b by its inner end (towards the attachment fitting 13 and the lever 11), for example by a process of electron beam welding onto the shaft section 13c which the bar 14a is designed to extend. In order to guide the pivoting movement of the lever 11 on the attachment fitting 13, two elastomer, laminated conical bearings 15 are provided, one being mounted on each of the shaft sections 13c respectively (see FIG. 3b).

As illustrated in FIGS. 4 et 5, each of the bearings 15 comprises two rigid metal collars, an inner collar 15a and an outer collar 15b, each having an internal bore and an external surface which are cylindrical and coaxial, the two collars 15a and 15b being separated from one another by a tubular, frustum-shaped layer of elastomer 15c, the lateral faces of which are bonded respectively to the frustum-shaped outer face of the inner collar 15a and inner face of the outer collar 15b respectively.

The lever 11 is guided in rotation on the attachment fitting 13 by the bearings 15, assisted by two rigid side plates 16a and 16b secured to the end of the lever 11 at the end opposite that of the vibrating weight 12, each side plate 16a and 16b having a first cylindrical bore housing one of the respective bearings 15, retained by a shoulder of its outer collar 15b against the inner face of a recess 17 in the side plate 16a or 16b (see FIGS. 3c and 5). Moreover, the side plate 16b supports a torsion tube 14b projecting laterally towards the exterior and coaxially with its bore housing the corresponding bearing 15, the inner end (towards the side plate 16b, hence towards the attachment fitting 13 and the lever 11) of the torsion tube 14b being secured to the side plate 16b, also by electron beam welding for example, whilst the outer or opposite end of the torsion tube 14b has internal longitudinal splines engaging with external longitudinal splines on the outer end of the torsion bar 14a, so that the splines 14c firmly engage the outer ends of the bar 14a and the tube 14b with one another. This join may be assisted by a locking end-piece 14d enclosing the outer ends of the bar 14a and the tube 14b, and fitted with transverse fixing screws 14e (see FIG. 3d). In another variant, the outer ends of the bar 14a and the tube 14b may be welded to one another. It would also be possible to use transverse conical locking rods.

The two side plates 16a et 16b are mounted facing one another, directed so that their recesses 17 face, and these side plates are fixed to one another at their outer ends 16c (at the side opposite the lever 11) being joined by transverse screws 16d, and at their inner end-pieces 16e (towards the lever 11), which are disposed back to back and are also joined by a transverse screw 16f.

The end-pieces 16e of the two side plates 16a et 16b, which are substantially parallel with one another and with the axis Z—Z of the rotor, are directed towards the lever 11, which is attached to these end-pieces 16e by four screws 11c at its end opposite that 11a on which the vibrating weight 12 is mounted, also being secured by screws 12a (see FIG. 3e).

The bottom end of the corresponding oblique bar 8 is provided with a ball joint 18 engaged between the two side plates 16a and 16b, in their recesses 17, and the central part of which has a pivot pin 19 passing through it (see FIG. 5) with a pivot axis substantially parallel with the pivot and torsion axis v—v and formed by a screw 19a and nut 19b assembly, the screw 19a of which is inserted through the inner collars 20a of two elastomer, laminated, conical bearings 20 similar to the bearings 15, each located in a second cylindrical bore of one of the respective side plates 16a and 16b, the outer collar 20b of each retaining the corresponding bearing 20 in the second bore of the corresponding side plate 16a or 16b by means of an inner shoulder bearing against the inner face of the corresponding recess 17. Furthermore, the central part of the ball joint is held in check between the inner collars 20a of the two conical bearings 20 having at least one central layer of elastomer 20c.

Accordingly, the bottom end of the oblique bar 8 is mounted in an articulated fitting by the ball joint 18 on the pin 19, between the two side plates 16a and 16b joined to the lever 11 and guiding the pivoting movements thereof about the pivot and torsion axis v—v by means of the bearings 15, and simultaneously, the lever 11 is joined in motion, via the side plate 16b, to the inner end (towards the side plate 16b) of the outer torsion tube 14b, the outer end of which is secured to the outer end of the torsion bar 14a, which is secured to the attachment fitting 13 in a mounting whereby the outer torsion tube 14b and the inner torsion bar 14a, coaxial with the torsion axis v—v, form a double torsion spring mounted between the attachment fitting 13 and the lever 11 (see FIGS. 3 and 5).

FIGS. 6 and 7 illustrate an example of a preferred embodiment of the conical bearings 15 and 20 as well as the attachment fitting 13, which specifically avoids any fretting at the interface between the bearings 15 and the attachment fitting mounting fixture 13b. To this end, the inner collar 15a of each of the two conical bearings 15 has an arcuate rim 21 (see FIG. 6) projecting along the axis of the bearing 15 in the direction of the facing part on the attachment fitting mounting fixture 13b, which has a recess 22 of matching shape. Accordingly, when the bearing 15 is mounted by its inner collar 15a on the corresponding shaft section 13c, the rim 21 of this inner collar 15a locks in the recess 22 of the attachment fitting mounting fixture 13b, thereby ensuring an anti-fretting lock-fit. Furthermore, the inner collar or shoulder 23 of the outer collar 15b of each conical bearing 15 has a flat section 24 applied against a flat section 26 (see FIG. 7) on the inner collar 25 or shoulder of the outer collar 20b of the second conical bearing 20 housed in the same side plate 16a or 16b in order to prevent the outer rings 15b and 20b from rotating.

As a result of this mounting, the conical bearings 20 and 15 allow an articulated mounting without any friction of the vibrator, comprising the assembly of the two side plates 16a and 16b, the lever 11 and the weight 12, on the corresponding oblique bar 8 on the one hand, and on the attachment fitting 13 on the other hand. This attachment fitting 13 serves several functions, particularly as a means of securing the suspension to the structure 1, thereby absorbing static and dynamic forces and torques. The attachment fitting 13 also acts as a guide for the conical bearings 15 and stops its inner collars 15a from rotating in order to prevent fretting at the interface. Furthermore, the attachment fitting 13 provides a lateral anchor for the inner end (adjacent to the attachment fitting 13 and the lever 11) of the inner torsion bar 14a of the double torsion spring 14. The corresponding oblique bar 8 provides a link between the gearbox 2 (see FIGS. 1 and 2) and the vibrator (11, 12, 16a, 16b), thereby transmitting the static and dynamic forces and torques to which the head of the rotor 3 is subjected, and the bar 8 also transmits the relative movement between the gearbox 2 and the structure 1 to the vibrator, which is of a rigidity adapted to the dynamic requirements due in particular to an appropriate selection of the size and shape used for the lever 11, the cross section of which may be of several possible designs, U-shaped in particular, as illustrated in the example described above, or of a double U shape, or alternatively a T or double T shape or a double L shape, whilst the vibrating weight 12, which may be of a different dimension from one vibrator to the other if the suspension device is not symmetrical, is preferably made from a high-density material so that its dimensions can be reduced. The purpose of the two side plates 16a and 16b is to transmit to the vibrator the relative movement between the gearbox 2 and the structure 1 (attachment fitting 13), the vibrator constituting a system which dynamically amplifies this relative movement imparted to the vibrating weight 12. Another function of the side plates 16a and 16b is to house the conical bearings 15 and 20 so as to provide an articulated link without damping the vibrator to which these side plates are connected, along with the bar 8 and the attachment fitting 13. Finally, the side plates 16a and 16b joined to one another introduce a flexible link between the attachment fitting 13 and the vibrator due to the torsion tube 14b supported by the side plate 16b.

The suspension device proposed by the invention and described above essentially operates in the same way as the devices proposed by the prior art and described in U.S. Pat. No. 4,458,862 and U.S. Pat. No. 4,431,148, the main difference being that the flexible linking elements between the gearbox 2 and the structure 1 are torsion springs provided between the vibrators and the structure 1 instead of blades working in a bending function between the vibrators and the base of the gearbox, as is the case in the above-mentioned patents.

The sub-assembly of the device illustrated in FIG. 8 differs from that described above with reference to FIGS. 3 to 7 only by virtue of the fact that each vibrator (11, 12, 16a, 16b) is linked to the attachment fitting 13 by two double torsion springs 14 instead of one. The two springs 14 are symmetrical on either side of the attachment fitting 13 and side plates 16a and 16b, and each of the two shaft sections 13c of the attachment fitting mounting fixture 13b is axially extended and secured at the end to a torsion bar such as 14a, and each of the side plates 16a and 16b supports a torsion tube such as 14b projecting laterally towards the exterior coaxially with the torsion axis v—v and such that the outer lateral end of this torsion tube 14b is joined in motion to the outer lateral end of the inner torsion bar 14a projecting laterally on the same side by means of longitudinal meshing splines such as 14c, a locking end-piece such as 14d with transverse screws such as 14e, and/or alternatively by welding and/or by means of conical pins, for example.

A sub-assembly of this type can be twice as rigid under torsion if the two springs 14 and the members co-operating with them are of the same geometry or, in another variant producing the same stiffness under torsion, if each of the two torsion springs are of a smaller size than the torsion spring 14 of the example described in relation to FIGS. 3 to 7.

The embodiment of the sub-assembly of the device illustrated in FIGS. 9 to 14 has many components identical or similar to those in the example described with reference to FIGS. 3 to 7 and these members are referred to by the same numbers or the same number and a prime symbol.

In this variant, the lever 11' consists of two longitudinal halves 11'd and 11'e (see FIG. 9), each of which is formed as an integral part with one of the respective side plates 16'a and 16'e, thereby constituting the outer radial end of the lever 11', and the two halves 11'd and 11'e of this lever 11' are symmetrically joined to one another on either side of the longitudinal axis y—y of the lever 11' by transverse screws 16'd inserted through the outer ends 16'c of the side plates 16'a and 16'e, and by other transverse screws 16'f inserted through the inner ends of the side plates. The inner ends of the half-levers 11'd and 11'e constitute the inner end 11'a of this lever on which a weight (not illustrated) is mounted by screws, similar to the weight 12 mounted by screws 12a on the lever 11 of FIG. 3e.

The bottom end of the oblique bar 8 is articulated by means of a ball joint, such as the ball joint 18 of FIG. 5, between the side plates 16'a and 16'e, as in the previous example, this ball joint being retained about the pivot pin 19, having a pivot axis parallel with the torsion axis v—v and comprising the screw 19a and nut 19b assembly, the screw 19a of which is inserted through two elastomer, laminated, conical bearings such as those of 20 in FIG. 5. Accordingly, the ball joint of the bottom end of the oblique bar 8 is retained and articulated in a pivoting motion between the side plates 16'a and 16'e by means identical to those described with reference to and illustrated in FIG. 5.

Similarly, the lever 11' is guided in its pivoting movements about the pivot and torsion axis v—v on the structure 1 by means of the side plates 16'a and 16'e mounted so as to rotate by means of two elastomer, laminated, conical bearings 15, identical to those of FIG. 5, each of the inner metal collars 15a of which is retained about one of the two respective pivot shaft sections 13'c, coaxial with the pivot and torsion axis v—v, and each projecting laterally at one side of a main mounting fixture 13'b supported by a base plate 13'a of a structural attachment fitting 13', rigidly secured to the structure 1 of the helicopter by its base plate 13'a, which also supports an auxiliary mounting fixture 13'd, laterally offset from the main mounting fixture 13'b on the base plate 13'a (see FIG. 14).

In this example, the pivot shaft of the lever 11' and the side plates 16'a and 16'b on the mounting fixture 13'b of the attachment fitting 13' is a pivot pin 27, comprising a screw 28 and nut 29 assembly, the screw 28 being inserted not only through the inner collars 15a of the two bearings 15, but also through two stepped collars 30 housed end to end in a bore through the mounting fixture 13'b, the steps of which, projecting onto the side faces of this mounting fixture 13'b, bear against the internal faces of the inner collars 15a, the external faces of which are retained one against a shoulder of the head of the screw 28 and the other against a washer 31 held in place by the nut 29 screwed onto the threaded end of the stem of the screw 28. The pivot shaft sections 13'c therefore consist of the two parts of the stem of the screw 28 projecting out from either side of the mounting fixture 13'b.

As far as the mounting of the bearings 15 is concerned, their outer metal collars 15b are retained by shoulders in the housing (such as 17 in FIG. 5) inside the side plates 16'a and 16'e as in the previous example.

Also as in the previous example, each of the side plates 16'a and 16'e therefore houses two elastomer, laminated, conical bearings, the outer collars of which may have flat sections such as 24 and 26 in FIGS. 6 and 7, bearing one against the other in order to prevent them from rotating, and the inner collar 15a of the bearing 15 may have a rim (such as 21 in FIG. 6) projecting towards a recess of matching shape provided in the mounting fixture 13'b or, in this example, in the facing shoulder of the corresponding stepped collar 29 to prevent fretting.

In a manner specific to this embodiment of the sub-assembly, the double torsion spring 14' linking the lever 11' to the structural attachment fitting 13' has an elongate inner torsion member 14'a, which is a torsion bar but which may also be a torsion tube, extending coaxially with the torsion and pivot axis v—v and made integral by its inner end 14'f, for example by electron beam welding, laterally against a side of a side plate 16'a, about the bore of this side plate 16'a housing the bearing 15 and corresponding pivot shaft section 13'c. The outer lateral end (at the end opposite the lever 11' and the attachment fitting 13') of the inner torsion member 14'a is shaped to provide a flange 14'g, projecting radially towards the exterior relative to the axis v—v. This outer end flange 14'g, which is cylindrical in shape and circular in cross section, is joined by a screw ring 32, parallel with the axis v—v, against the inner face of the base 14'h at the outer end of an outer torsion tube 14b, coaxial with the inner torsion member 14'a, about the axis v—v, the inner end of which is a flange 14'i projecting radially towards the exterior relative to the axis v—v. In another variant, the base 14'h may be recessed at its central part so that it is limited to an end flange projecting radially towards the interior, secured to the flange 14'g of the inner torsion member 14'a by screws 32. The screws 32, which join the outer ends 14g and 14'h of the inner torsion member 14'a and the outer torsion tube 14'b, bear with their heads against the outer face of the base 14'h, nuts 33 being screwed onto the threaded ends of their stems projecting towards the interior of the flange 14'g. Similarly, the flange 14'i at the inner end of the torsion tube 14'b is secured against the outer face of the auxiliary mounting fixture 13'd, of a matching a <<U>> shaped design and open at the top (see FIGS. 11 and 12), by screws 34 parallel with the axis v—v, the heads of which bear against the outer face of the flange 14'i, and with nuts 35 screwed onto the threaded ends of the screws 34 projecting towards the interior of the auxiliary mounting fixture 13'd.

This mechanism operates in the same way as that described with reference to FIGS. 3 to 7, the main difference being that the inner end 14'f of the inner torsion member 14'a is not joined to the attachment fitting 13' but to a side plate 16'a of the lever 11', whilst the inner end 14'i of the outer torsion tube 14'b is not joined to a side plate of the lever but to the auxiliary mounting fixture 13'd of the structural attachment fitting 13'. However, the outer torsion tube 14'b and the inner torsion member 14'a still act under torsion about the torsion axis v—v and pivot axis of the lever 11' on the structural attachment fitting 13', as explained above. If necessary, this embodiment can be used as a means of providing a high level of stiffness in the outer tube 14'b and in particular will produce a solid connection between the outer torsion tube 14'b and the inner torsion member 14'a at their outer ends 14'h and 14'g.

As illustrated in FIG. 8, the lever 11' of the example illustrated in FIGS. 9 to 14 may be connected to the structural attachment fitting 13' by two torsion springs such as 14', each of which projects laterally from a respective side of the lever 11'. In this case, the attachment fitting 13' has a second auxiliary mounting fixture on its base plate 13'a such as that shown by 13'd, but symmetrical therewith on the other side of the main mounting fixture 13'b, and the inner end, such as 14'i, of the outer torsion tube, such as 14'b, of the second double torsion spring is secured on this second auxiliary mounting fixture, whilst the inner torsion member, such as 14'a, of the second double torsion spring is attached by its inner end, such as 14'f, to the other side plate 16'e, in a mounting similar to that illustrated in FIG. 14, but symmetrical relative to the main mounting fixture 13'b of the attachment fitting 13'.

Other embodiments of the outer ends of the outer torsion tube and the inner torsion member and the way they are connected are illustrated in FIGS. 15 to 26, which will now be described.

In the embodiment illustrated in FIGS. 15 and 16, the outer end of the inner torsion member 14'a is a cylindrical end with a circular cross section 36 inserted in an oversized tubular outer end 37, also with a circular cross section, of the outer torsion tube 14'b, the two outer ends 36 and 37 being joined to one another by a radial screw 38 inserted through the tubular end 37 and screwed into the cylindrical end 36, whilst the head of an axial screw 39 (along the axis v—v), the stem of which is threaded in the cylindrical end 36, is retained against the outer face of a cap-shaped end-piece 40 which is therefore retained so that it encloses the two ends 36 and 37 and covers the head of the radial screw 38 bearing against the outer face of the tubular end 37.

The embodiment illustrated in FIGS. 17 and 18 is similar to that illustrated in FIG. 5, in the way that the outer ends of the outer torsion tube 14b and the inner torsion member 14a are joined to one another by axial splines 14c. In effect, rounded splines 14'c are provided parallel with the torsion axis v—v in the external face of the outer cylindrical end 41 of the inner torsion member 14'a and these splines 14'c locate between splines of matching shape provided axially in the internal face of the oversized tubular outer end 42, having a circular cross section, of the torsion tube 14'b. Accordingly, the outer ends 41 and 42 are therefore joined by a system whereby these ends slot one inside the other and are of a complementary shape which prevents them from rotating one relative to the other about the torsion axis v—v.

The same applies to the embodiment illustrated in FIGS. 19 and 20, in which the outer end 43 of the inner torsion member 14'a, is cylindrical and has a polygonal cross section, hexagonal for example, centred on the torsion axis v—v, and inserted with virtually no radial clearance in a bore, of the same polygonal (hexagonal) cross section, of the oversized, tubular outer end 44, having a cylindrical external surface which is circular in cross section, of the outer torsion tube 14'b.

In the embodiment illustrated in FIGS. 21 and 22 as with that shown in FIGS. 23 and 24, an outer end 43 of the inner torsion member 14'a has an external face with a polygonal cross section, hexagonal in this example, facing an internal face with the same shape of polygonal cross section on the oversized, tubular outer end 44' of the outer torsion tube 14'b. However, in these two embodiments illustrated in FIGS. 21 to 24, the external face of the outer end 44' has a cross section of the same polygonal (hexagonal) shape. Furthermore, locking screws 45 are screwed from the outside in, through the tubular outer end 44', perpendicular to the facets of its polygonal internal and external faces, these screws 45 being screwed into the outer end 44' until their ends come to bear against the facing facets on the external polygonal face of the outer end 43 of the inner torsion member 14'a. In the embodiment illustrated in FIGS. 21 and 22, four locking screws 45 are used, two being diametrically opposite relative to the torsion axis v—v, whilst the other two are each screwed into one of the two respective facets of the external polygonal face of the outer end 44' located between the two facets of this same external face in which the two screws 45 are screwed diametrically opposite one another. Accordingly, the outer end 43 of the inner torsion member 14'a is applied without clearance by the two facets of its external face against which none of the screws 45 bears, against the two facing facets of the internal face of the tubular outer end 44', which provides a robust fitting for the two outer ends 43 and 44'.

In the embodiment illustrated in FIGS. 23 and 24, six locking screws 45 are screwed in three pairs of diametrically opposed screws 45 so as to bear against all the facets of the external face, which has a hexagonal cross section, of the outer end 43 of the inner torsion member 14'a.

In these two embodiments (FIGS. 21 to 24), a counter-nut 45' is screwed onto each screw 45 and tightened against the external face of the outer end 44' to prevent the locking screws from coming loose 45.

Figure 25:
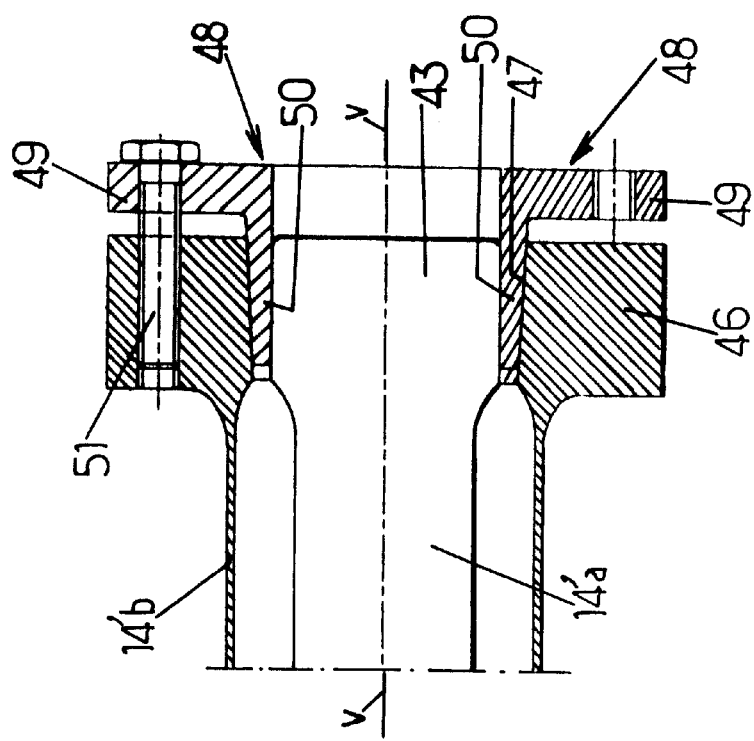

In the embodiment illustrated in FIGS. 25 and 26, an outer end 43 of the inner torsion member 14'a has a hexagonal section, this outer polygonal end 43 being located inside the oversized, tubular outer end 46 of the outer torsion tube 14'b. This tubular outer end 46 has an internal surface 47 in the shape of a truncated pyramid with an axis v—v and a cross section of the same polygonal shape as the cross section of the outer end 43 of the inner torsion member 14'a, i.e. a hexagonal section. Furthermore, the internal face of the outer end 46 which has a truncated pyramid shape, converges towards the inner ends of the outer torsion tube 14'b and the inner torsion member 14'a, i.e. towards the lever and the corresponding attachment fitting. Keying blocks 48, each having a flange 49, projecting radially towards the exterior relative to the torsion axis v—v, and at least a wedge-shaped axial part 50 tapering at the end opposite the flange 49 and delimited between two planar faces, are engaged by their wedges 50 between the hexagonal external face of the outer end 43 and the internal face 47, which has the truncated pyramid shape and hexagonal cross section, of the outer end 46. This mechanism whereby the wedges 50 of the keying blocks 48 engage between the outer ends 43 and 46 ensures that the outer ends 43 and 46 are both centred and joined in rotation about the torsion axis v—v, and the wedges 50 are held in position by screws 51 parallel with the axis v—v and which are screwed through the flanges 49 of the keying blocks 48, in the part which is oversized radially towards the exterior of the outer end 46 of the outer torsion tube 14'*b*.

In the example illustrated in FIGS. 25 and 26, three keying blocks 48 are provided, each having a flange 49 substantially in the shape of a circle segment, extending across an angle of approximately 110° at the centre and supporting two wedges 50 arranged as two adjacent sides of a tube with a hexagonal internal and external cross section having an external face of a truncated pyramid shape matching that of the internal surface 47, and with a cylindrical internal face about the cylindrical external face, having a hexagonal section, of the outer end 43. The three keying blocks 48 are each secured to the end 46 by two screws 51 through their flanges 49, and such that the three keying blocks 48 therefore have six wedges 50, each engaged between two facing facets of the internal face 47, having the truncated pyramid shape and the cylindrical external face with a hexagonal section, of the ends 46 and 43 respectively.

In another variant, if the sections of the facing faces of the ends to be prevented from rotating are octagonal, for example, four keying blocks may be provided, each having two adjacent wedges such as 50 so that all the wedges of the different keying blocks are engaged between all the facing facets of the internal and external faces, having a polygonal section, of the ends to be joined.

Figure 28:
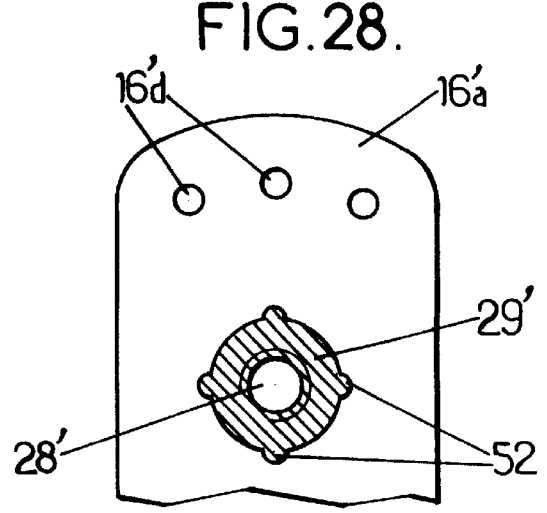

FIGS. 27 and 28 give a partial illustration of a different embodiment of the example described with reference to FIGS. 9 to 14. This embodiment gets round the disadvantage inherent in the examples described above, this disadvantage being that the attachment fitting can not be mounted on the fuselage of the helicopter firstly, before the other pre-assembled elements of the corresponding sub-assembly are fitted, namely the inclined bar, the vibrator, and the torsion spring or springs. Only when a subassembly has been fully assembled can it be mounted on the structure by its attachment fitting, which may lead to problems in terms of positioning and adjusting this fitting relative to the fixing points on the fuselage, which may well require corrective action.

The embodiment illustrated in FIGS. 27 and 28 essentially differs from the example illustrated in FIGS. 9 to 14 only by the structure of the pivot pin 27' which allows the lever 11' and its side plates 16'*a* and 16'*e* to be joined to and pivoted on the main mounting fixture 13'*b* of the attachment fitting 13', the structure of the embodiment shown in FIGS. 27 and 28 being otherwise identical to the example shown in FIGS. 9 to 14 and the same reference numerals denoting the corresponding components. In this embodiment, the pivot pin 27' consists of a screw-nut assembly, the screw 28' of which, as with the screw 28 of the previous example, is inserted through the inner collars of the elastomer, laminated, frustum-shaped bearings 15 in bores of the side plates 16'*a* and 16'*e* and the stepped collars 30 in the bore of the mounting fixture 13'*b*, but this screw 28' is engaged in these elements from the bore of the side plate 16'*e* to the bore of the side plate 16'*a*, and the nut 29' of the screw-nut assembly of the pivot pin 27' is a nut with one or more studs 52 projecting radially towards the exterior (relative to the axis of the nut 29 and the screw 28'), for example four studs 52 as illustrated in FIG. 28, which are distributed along the periphery of the nut 29 in two pairs of diametrically opposite studs, which are moved so as to locate in matching axial grooves in the bore of the side plate 16'*a*, in order to lock this nut 29' and prevent it from rotating about the pivot and torsion axis v—v. Furthermore, the ends of the locating grooves for the studs 52, at the end opposite the mounting fixture 13'*b*, form a shoulder 53 (see FIG. 27) which locks the nut 29 axially (along v—v) in position in the inner bore of the side plate 16'*a* close to where this side plate 16'*a* is joined to the inner lateral end 14'*f* of the inner torsion member 14'*a* of the double torsion spring 14', identical to that of the previous example, the outer torsion tube 14'*b* of which is secured, as above, by its inner end flange 14'*i* against the auxiliary mounting fixture 13'*d* of the structural bearing 13'. Another difference compared with the previous example is that, in the embodiment illustrated in FIGS. 27 and 28, a pin (not illustrated) may be located perpendicularly to the axis v—v in two small bores 54, one in the extension of the other and arranged in the parts of the side plate 16'*e* located on either side of the portion of its bore receiving a bearing 15 and in which the head of the screw 28' is housed, this head having two tabs also pierced with bores, one in the extension of the other, to provide a passage for the pin inserted through the bores 54.

The assembly sequence for this embodiment is as follows: firstly, the attachment fitting 13' is secured to the structure of the fuselage. Then, the nut 29' is located in the bore of the side plate 16'*a*, in which it is prevented from rotation and axial displacement by means of the studs 52 and the shoulder 53. The bearings 15 are then mounted in the side plates 16'*a* and 16'*e* with the two side plates 16'*e* and 16'*a* facing one another and they are tightened one against the other by means of the screws provided for this purpose and described above, to form the lever assembled in this manner with the bearings 15, this lever also being assembled, as described above, on the bottom end of the corresponding oblique bar 8. After these operations, the lever is set in place on the main mounting fixture 13'*b*, which is therefore straddled by the two side plates 16'*a* and 16'*e* with their bearings 15. The screw 28' is then inserted through the inner collars of the bearings 15 of the side plates 16*a* and 16'*e* and in the stepped collars 30 of the mounting fixture 13'*b*, and, finally, the screw 28' is tightened in the immobilised nut 29 to complete assembly of the sub-assembly. The interest of this embodiment therefore resides in the shape of the nut 29', which prevents it from rotating about the axis v—v and which allows the structural fitting 13' to be set in place on the structure before the other components of the sub-assembly, allowing initial adjustments to be made to the attachment fitting 13' beforehand.

In the different embodiments of the double torsion spring described above, the outer torsion tube and the inner torsion member (tube or bar) are advantageously biased if their dimensions and the materials from which they are made are chosen so that the outer torsion tube and the inner torsion member act under torsion in a substantially balanced manner, i.e. exhibit substantially the same flexibility under torsion, which may mean that the material chosen for the inner torsion member will have a higher modulus of elasticity.

The anti-resonant suspension devices proposed by the invention are compatible with the complementary means needed to impart the reaction to the engine torque on the gearbox to the structure of the fuselage, in particular, whilst allowing slight vertical displacements and angular oscillations of the gearbox about axes located in the plane of the base of, this gearbox, these complementary means being a suspension membrane fixed to the base of the gearbox on the one hand and, on the other hand, the structure of the fuselage around this box, as explained in U.S. Pat. No. 4,431,148, or alternatively devices having a pair of identical and parallel rod linkages pivotably mounted between the base of the gearbox and the structure of the fuselage, optionally by means of a torsion tube or lever(s) co-operating with elastic return means, as described in U.S. Pat. No. 5,782,430 and U.S. Pat. No. 5,788,182, which describe a link between the upper structure of the fuselage and the base of the main gearbox which is stiffer in the plane of this upper structure.

What is claimed is:

1. An anti-vibration suspension device for a helicopter main rotor comprising a rotor mast driven in rotation by a main gearbox about an axis of the mast, which is the axis of rotation of the rotor, the suspension device comprising at least three oblique bars supporting the gearbox on the helicopter structure, the oblique bars being distributed around the gearbox and inclined relative to one another on the side of their top ends, the oblique bars being articulated, on the one hand on the gearbox by means of their top ends, and on the other hand on the helicopter structure by their bottom ends, and by means of levers, a same number of these being provided as there are oblique bars, each lever supporting at least one vibrating weight at one end and being pivotably joined to the structure by an opposite end-part, in the vicinity of which the bottom end of a corresponding oblique bar is pivotably mounted on the corresponding lever, the joints linking each lever to the structure and to the corresponding oblique bar being articulated joints which pivot at least about axes substantially perpendicular to a corresponding plane passing through the longitudinal axis of the corresponding oblique bar and the vertical projection of said longitudinal axis onto said structure, wherein each lever is also joined to the structure by at least one torsion spring, biased about a torsion axis substantially parallel with said pivot axes.

2. A device as claimed in claim 1, wherein said torsion axis of said at least one torsion spring substantially merges with said pivot axis of said lever on the structure.

3. A device as claimed in claim 1, wherein for at least one lever, said at least one torsion spring comprises at least one elongate torsion member, an outer end of which relative to the lever is joined to the structure whilst an other end, being an inner end relative to the lever, is joined in motion to said lever.

4. A device as claimed in claim 1, wherein, for at least one lever, said at least one torsion spring is a double spring comprising an outer torsion tube and an inner elongate torsion member, which is at least partially inserted in the outer torsion tube, coaxial with said torsion axis, one of said torsion tube and member having an end-part joined in motion to said lever, whilst the other of said torsion tube and member has an end-part secured to said structure, the opposite end parts of said torsion tube and member being joined in motion to one another.

5. A device as claimed in claim 4, wherein at least one lever is pivotably mounted on the structure, being mounted so as to pivot on an attachment fitting which is rigidly fixed to the structure, and is joined to said attachment fitting by at least one double torsion spring, projecting laterally from a side of the lever and the attachment fitting, and the outer ends, relative to said lever and said attachment fitting, of said outer torsion tube and inner torsion member of said double torsion spring are secured to one another.

6. A device as claimed in claim 5, wherein, for at least one lever and for at least one corresponding double torsion spring, said double torsion spring is such that its outer torsion tube and its inner torsion member are joined in motion to said lever and said attachment fitting respectively at their inner end relative to said lever and said attachment fitting.

7. A device as claimed in claim 5, wherein, for at least one lever and for at least one corresponding double torsion spring, said double torsion spring is such that the outer end relative to said lever and said attachment fitting of its outer torsion tube and its inner torsion member is joined in motion to said attachment fitting and said lever respectively.

8. A device as claimed in claim 6, wherein, for at least one lever, said attachment fitting supports a pivot shaft, having two shaft sections coaxial with the pivot axis of the lever on the structure, each shaft section projecting laterally from a side of said attachment fitting respectively, on which fitting the lever is pivotably mounted by two rigid side plates, each respectively guided in rotation on one of the pivot shaft sections of the attachment fitting by means of one of two respective laminated, conical bearings.

9. A device as claimed in claim 8, wherein for at least one lever and for at least one corresponding double torsion spring, the inner torsion member of said double torsion spring is secured coaxially to the end of a pivot shaft section secured to a mounting fixture of the attachment fitting.

10. A device as claimed in claim 8, wherein for at least one lever and for at least one corresponding double torsion spring, the outer torsion tube is secured to a side plate of the lever and projects laterally on said side plate.

11. A device as claimed in claim 8, wherein for at least one lever and for at east one corresponding double torsion spring, the inner torsion member is secured to a side plate of the lever and projects laterally on said side plate.

12. A device as claimed in claim 8, wherein for at least one lever and for at least one corresponding double torsion spring, the outer torsion tube is secured by its inner end to an auxiliary mounting fixture of the attachment fitting which has a main mounting fixture supporting the pivot shaft.

13. A device as claimed in claim 8, wherein for at least one lever, one at least of the two laminated, conical bearings by means of which the side plates of the lever are pivotably mounted on the attachment fitting has an inner collar having stop means co-operating with facing stop means on the attachment fitting in order to prevent said inner collar from rotating on the corresponding pivot shaft section on said attachment fitting.

14. A device as claimed in claim 8, wherein for at least one lever, the bottom end of the corresponding oblique bar is pivotably mounted on said lever by means of a ball joint retained on a pivot pin mounted between the two side plates of said lever by means of two laminated, conical bearings each housed respectively in one of the side plates.

15. A device as claimed in claim 14, wherein for at least one lever, at least one of the side plates of said lever has two recesses, each receiving respectively one of the two laminated, conical bearings on which said side plate is respectively pivotably mounted on the attachment fitting and on the corresponding oblique bar, the two laminated, conical bearings each having an outer collar with a flat section in contact with the flat section of the outer collar of the other bearing in order to prevent said outer collars from rotating.

16. A device as claimed in claim 8, wherein for at least one lever, the two corresponding side plates are secured facing one another at one end of the lever, the corresponding vibrating weight being mounted on the other end, and such that the corresponding attachment fitting is partially encased between the two side plates.

17. A device as claimed in claim 4, wherein for at least one double torsion spring, the outer ends, relative to the lever, of the outer torsion tube and the inner torsion member are of substantially complementary shapes and are at least partially inserted one inside the other and secured to one another.

18. A device as claimed in claim 4, wherein said outer ends of the outer torsion tube and the inner torsion member are secured to one another by means of at least one screw extending substantially parallel with or transversely to said torsion axis.

19. A device as claimed in claim 17, wherein said outer ends of the outer torsion tube and the inner torsion member are secured to one another at least by means of matching splines substantially parallel with said torsion axis.

20. A device as claimed in claim 17, wherein said outer ends of the outer torsion tube and the inner torsion member are secured to one another at least by means of a locking end-piece encasing said outer ends.

21. A device as claimed in claim 17, wherein said outer end of the inner torsion member has an end flange projecting radially towards the exterior relative to said torsion axis and secured to an end flange, projecting radially towards the interior or to a base of said outer torsion tube at its outer end, by means of screws substantially parallel with said torsion axis.

22. A device as claimed in claim 17, wherein said outer ends of the outer torsion tube and the inner torsion member respectively have an internal face and an external face facing one another and having a cross section of a substantially polygonal shape.

23. A device as claimed in claim 22, wherein said outer end of said outer torsion tube has an external face with a cross section of substantially the same polygonal shape as said internal faces of said outer ends respectively of the outer torsion tube and the inner torsion member, and at least one locking screw is screwed through said outer end of the outer torsion tube, substantially perpendicular to the facets of its external and internal faces with a polygonal cross section, and bears against a facet of the external face of the outer end of the inner torsion member.

24. A device as claimed in claim 22, wherein at least one of said internal and external faces of said outer ends respectively of the outer torsion tube and the inner torsion member has a shape in the form of a truncated pyramid, which converges towards the inner end of said torsion tube or member, and at least one keying block in the shape of a wedge tapering towards said inner end is engaged, substantially in the direction of said torsion axis, between said internal and external faces of said outer ends and has at least one flange projecting substantially radially towards the exterior relative to said torsion axis, and which is secured by at least one screw substantially parallel with said torsion axis and screwed into said outer end of the outer torsion tube.

25. A device as claimed in claim 8, wherein the pivot shaft linking the lever to the attachment fitting in a pivoting action is a screw and nut assembly, the nut being prevented from rotating about the torsion axis and checked in displacement along the torsion axis in one of the side plates of the lever.

26. A device as claimed in claim 1, wherein at least one lever is secured to the structure by two torsion springs, each of which projects laterally from a side of the lever respectively.

27. A device as claimed in claim 1, wherein each lever is oriented so that said corresponding at least one vibrating weight is radially inside the articulated joints of said lever on the structure and on said oblique bar, and inside said torsion axis of said at least one corresponding torsion spring relative to the axis of the rotor.

* * * * *